United States Patent
Dyer et al.

(10) Patent No.: US 6,236,934 B1
(45) Date of Patent: *May 22, 2001

(54) ELECTROMAGNETICALLY ACTUATED ROTATING MACHINE UNBALANCE COMPENSATOR

(76) Inventors: Stephen William Dyer, 1836 McIntyre, Ann Arbor, MI (US) 48105; Brian Kent Hackett, 8424 Warner, Saline, MI (US) 48176; Jack Kerlin, 984 E. 80 North, Springville, UT (US) 84663

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/974,307

(22) Filed: Nov. 19, 1997

Related U.S. Application Data

(63) Continuation of application No. 08/346,158, filed on Nov. 29, 1994, now Pat. No. 5,757,662.

(51) Int. Cl.$^7$ .............................. G06F 17/10; G06G 7/48
(52) U.S. Cl. .................. 701/124; 700/279; 324/207.12; 324/207.22; 324/207.13; 74/468; 74/469; 73/573 R
(58) Field of Search ................... 364/528.14, 474.06; 73/462, 65.01, 66, 458, 468–470, 572; 74/573 F, 573 R, 658; 702/56, 94, 101; 701/124; 427/598, 240, 256, 425; 219/494, 503, 508, 486, 497; 700/275, 279; 324/200, 202, 205, 207.12, 207.13, 207.21–207.25, 262

(56) References Cited

U.S. PATENT DOCUMENTS

| | | | |
|---|---|---|---|
| 3,861,025 | 1/1975 | Sims | 29/593 |
| 3,968,769 | * 7/1976 | Gusarov et al. | 74/468 |
| 4,319,151 | 3/1982 | Klotz | 310/152 |
| 4,340,948 | 7/1982 | Goodnight | 368/158 |
| 4,432,253 | 2/1984 | Kerlin | 74/573 R |
| 4,550,428 | 10/1985 | Yanagishima et al. | 381/86 |
| 4,626,147 | 12/1986 | Nystuen et al. | 409/133 |
| 4,684,944 | 8/1987 | Kerlin | 340/825.66 |
| 4,817,003 | 3/1989 | Nagase et al. | 701/124 |
| 4,977,510 | 12/1990 | Winzenz et al. | 701/124 |
| 4,983,915 | 1/1991 | Rossi | 324/207.17 |
| 5,144,862 | 9/1992 | Giberson et al. | 74/573 R |
| 5,161,414 | 11/1992 | Rubbelke | 73/658 |
| 5,168,187 | 12/1992 | Baer et al. | 310/49 R |
| 5,172,325 | 12/1992 | Heidari | 701/124 |
| 5,231,265 | 7/1993 | Hackett et al. | 219/494 |
| 5,240,358 | 8/1993 | Hackett et al. | 409/141 |
| 5,412,583 | 5/1995 | Cameron et al. | 364/568.14 |
| 5,453,598 | 9/1995 | Hackett et al. | 219/503 |
| 5,505,684 | 4/1996 | Piramoon | 494/16 |
| 5,540,615 | 7/1996 | Murtuza | 451/343 |
| 5,757,662 | * 5/1998 | Dyer et al. | 364/528.14 |

* cited by examiner

*Primary Examiner*—Jacques H. Louis-Jacques
(74) *Attorney, Agent, or Firm*—Chupa & Alberti, P.C.

(57) ABSTRACT

An electromagnetically actuated machine balancer including a plurality of peripherally placed magnetic circuits and a power driver which selectively interrupts the magnetic flux through the circuits, thereby moving unbalanced rotors in a desired manner to compensate for machine unbalance.

9 Claims, 27 Drawing Sheets

ELECTROMAGNETICALLY ACTUATED ROTATING MACHINE UNBALANCE COMPENSATOR

This application is a continuation of U.S. Ser. No. 08/346,158, filed Nov. 29, 1994, now U.S. Pat. No. 5,757,662.

FIELD OF THE INVENTION

This invention relates to a method and to an apparatus for balancing a spindle or other rotating machinery apparatus and, more particularly, to a method and apparatus for balancing a rotating spindle which is normally adapted to removably receive a tool.

Discussion

A typical machine tool assembly includes a rotating spindle or other type of elongated member which is normally adapted to selectively and removably receive a tool. Examples of such tools include lathes, milling machines, and other types of mechanical and/or electromagnetic devices. As the spindle rotates, the tool performs a certain predetermined operation.

Typically, these machine tool assemblies experience a certain amount of vibration caused by spindle and/or tool imbalance. Such vibrations or imbalance forces cause the tool to inaccurately perform the desired task and significantly decrease tool life. Such vibration forces increase as the algebraic square of the spindle rotational speed. New types of higher speed machine tool assemblies have experienced large and unacceptably high machining inaccuracies caused by this relatively large vibrational force.

Many attempts have been made to minimize such machine vibrations or imbalance forces by use of devices normally deployed upon the spindle and having manually adjusted weights or liquids which are adapted to be selectively moved in order to correct for these imbalances. While somewhat effective, these devices have been largely unacceptable since they require a relatively large amount of time to create the desired correction. This large time is required since each tool has a unique imbalance profile. Thus, each time a tool is changed a new balance adjustment must be made. Moreover, imbalance changes during the useful life of a single tool, requiring many adjustments even if the tool is changed or removed. If the correction time is relatively large, the "cycle time" or time interval needed to change and balance tools also become large and unacceptable.

There is therefore a need to provide a balancer apparatus which selectively corrects imbalance and thus corrects, reduces, and/or minimizes imbalance-induced vibration associated with rotating machine tool apparatuses including such apparatuses that rotate at relatively high speeds.

There is also a need to provide a balancer which corrects a relatively large amount of machine tool imbalance without detrimentally affecting cycle time and which may be employed in combination with lathes, milling machines, and other types of tooling apparatuses.

SUMMARY OF THE INVENTION

It is therefore a primary object of this invention to provide a method and apparatus for selectively and relatively quickly and efficiently balancing rotating machine apparatuses and similar types of devices.

It is another of this invention to provide a method and apparatus which corrects a relatively large amount of vibration which is caused by rotating imbalance.

It is yet a further object of this invention to provide a method and apparatus for machine tool balancing which corrects relatively large amounts of vibration without significantly increasing tool change or cycle time.

It is a further object of this invention to provide a balancer having only two moving parts or portions, thereby increasing the working life of a balancer and allowing for a relatively simple design which results in relatively and substantially low manufacturing and maintenance costs.

It is yet another object of this invention to provide a balancer which includes two balancing weights which are adapted to be selectively deployed and movable in general proximity to the apparatus to be balanced. Such movement, in the preferred embodiment of this invention, is accomplished by use of electromagnetically-induced forces.

It is another object of this invention to provide a balancing apparatus which is adapted to include an electromagnetic field generator in substantial non-contact communication with a movable weighted portion. Such an electromagnetic field, in the preferred embodiment of the invention, consists of pulses of alternating polarity recurring at relatively low frequencies. The fast rise time of the pulses, however, corresponds to substantially high frequency content.

It is yet a further object of this invention to provide a balancing apparatus which operates at a wide range of machine speeds, including relatively high speeds, and which has a rotation speed threshold that is substantially limited only by the strength of the materials which are used to construct the balancer.

It is a further object of this invention to provide a balancer having two unbalanced components which are adapted to be selectively moved in proximate relation to a rotation apparatus and which are further adapted to retain their position through the use of a plurality of permanent magnets even if power is not applied to the balancer or the machine accelerates at a relatively high rate magnitude.

It is yet another object of this invention to provide a balancer which is adapted to allow for storage of various balancing condition information such that these conditions may be easily duplicated.

Lastly, it is also an object of this invention to provide a balancer which is relatively thin and which has a moving portion devoid of electronic components which may fail at such high rotational speeds.

According to the teachings of one aspect of the present invention a balancer is provided. The balancer is comprised of:

(a) Rotation means coupled to a spindle; and (b) Electromagnetic field generation means, in electromagnetic communication with said rotating means, for selectively moving a portion of said rotation means upon said spindle.

According to the teachings of a second aspect of the present invention a method of balancing a rotating machine is provided. The method compromises the steps of:

(a) Movably coupling a first member to said spindle;

(b) Placing two rotating members containing known unbalance and equipped with a plurality of permanent magnets in said first member;

(c) Electromagnetically communicating with said rotating members and permanent magnets, effective to move each rotating member independently to predetermined positions upon said rotating spindle.

Further objects, features, and advantages of the present invention will become apparent from a consideration of the following description and the appended claims when taken in conjunction with accompanying drawings.

BRIEF DESCRIPTION OF THE DRAWINGS

Various advantages of the present invention will become apparent to those skilled in the art by reading the following specification and by reference to the following drawings in which.

DETAILED DESCRIPTION OF THE INVENTION

Figure 1:
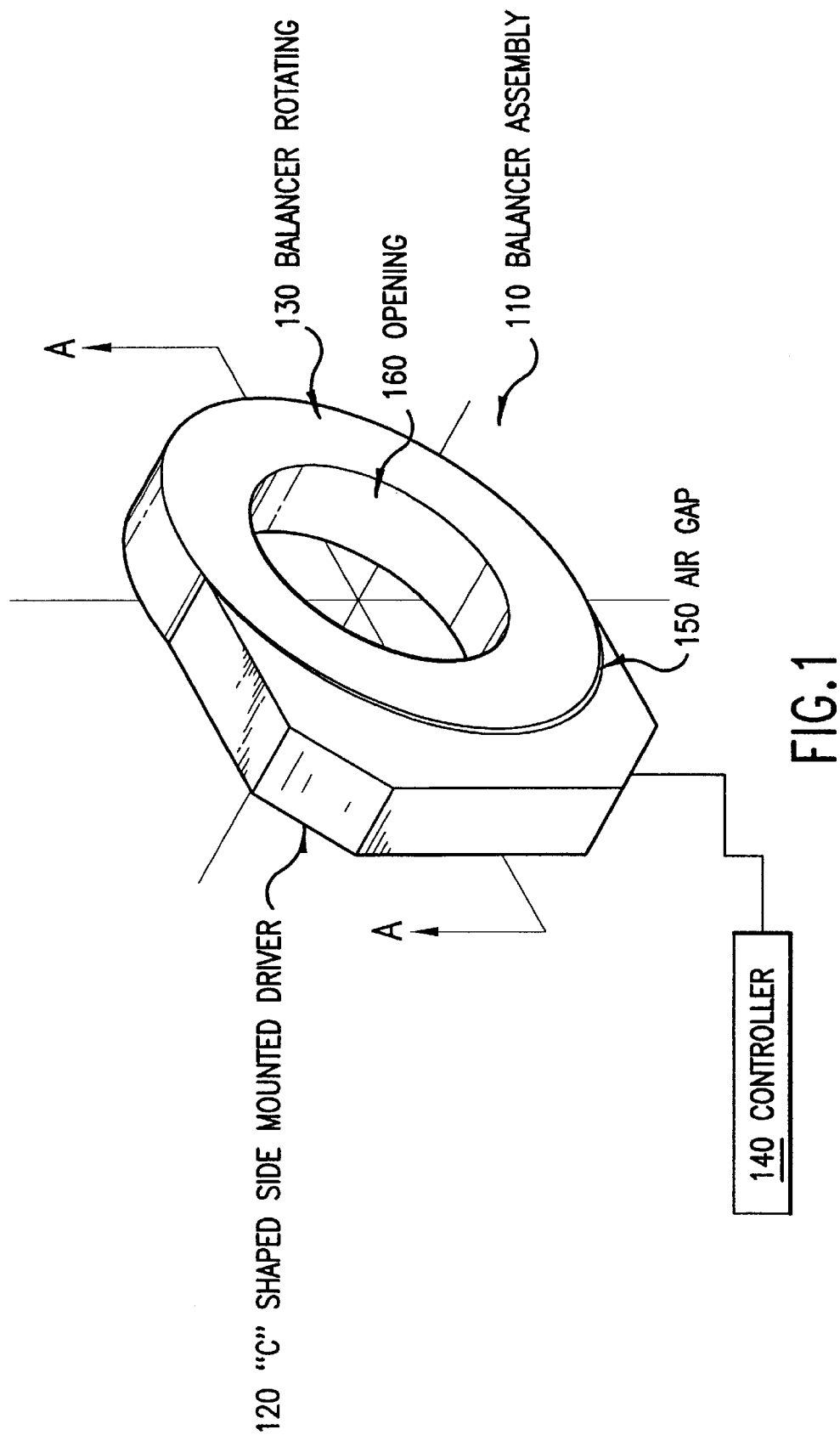
FIG. 1 is an isometric view of a balancer made in accordance with the teachings of the present invention.

FIG. 1 shows a balancer assembly 110 made in accordance with the teachings of one embodiment of this invention. As shown, balancer 110 includes a stationary-and generally "C", or angle shaped driver or electromagnetic field generator 120 which is in electromagnetic communication with a generally circular rotating assembly portion 130. Balancer assembly 110 further includes a remote stationary microprocessor based controller 140, operating under stored computer program control and adapted to control assembly 110 in a manner which, in one embodiment, is specified by the stored program and certain environmental and measured parameters as set forth later in this description. As will be seen, the control of assembly 110 is best achieved by selectively activating driver 120. As shown, driver 120 is adapted to be positioned in a relatively close but non-contacting position to portion 130, separated by an air gap 150. Such an air gap, in the preferred embodiment of the invention, should be as small as possible without allowing frictional contact between the rotating assembly portion 130 and the stationary driver 120 during machine operation. More particularly, this air gap should be less than one inch and most preferably less than about 1/16 inch to 1/8 inch. The electromagnetic signal emanates from driver 120 and is received by assembly 130. Since the power loss incurred by the electromagnetic signal is directly proportional to the algebraic square of the length of the air gap, the smaller the air gap, the more efficient the balancer will be.

As should be apparent to those of ordinary skill in the art, rotating assembly 130 is adapted to removably receive a conventional machine spindle or other rotating member through annulus or opening 160. Moreover, while it is presently contemplated that gap 150 be comprised of air, it is also contemplated by this invention that, in other invention embodiments, the gap may be filled with fluid or other type of material enclosed in a hollow member which is attached to driver 120 and which may further contact rotating portion 130 of assembly 110. The choice of materials may be based on such factors as efficiency of electromagnetic field transfer or communication between generator 120 and rotating assembly 130.

Figure 2:
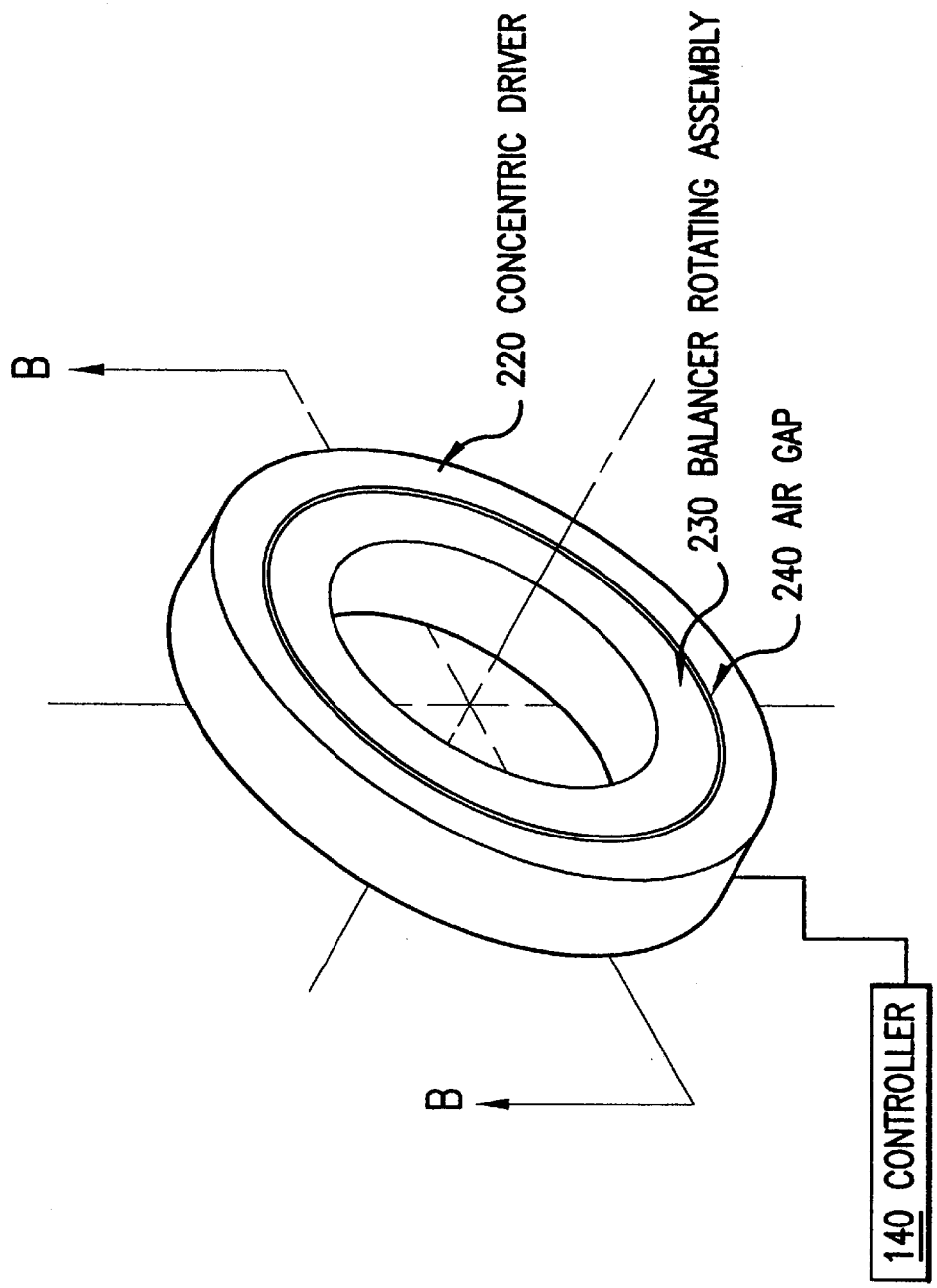
FIG. 2 is an isometric view of a balancer made in accordance with the teachings of a second embodiment of this invention.

FIG. 2 shows a second embodiment of the invention. In this embodiment, the driver, or electromagnetic field generator, 220 comprises a generally circular shaped assembly, concentrically positioned in relation to the balancer rotating machine reception portion 230. The rotating assembly portion 230 shown in FIG. 2 could, in one embodiment, be substantially similar to rotating assembly 130 shown in, and previously described with respect to FIG. 1. Furthermore, as in FIG. 1, there exists a gap 240 between the concentric driver 220 and the rotating assembly 230. This gap 240 may also be filled with some fluid other than air similar to that in the gap between the "C" shaped side mounted driver 120 and the rotating assembly 130. Moreover, the preferred gap spacing of gap 240 is, in one embodiment, substantially similar to that previously described with respect to gap 150.

Figure 3:
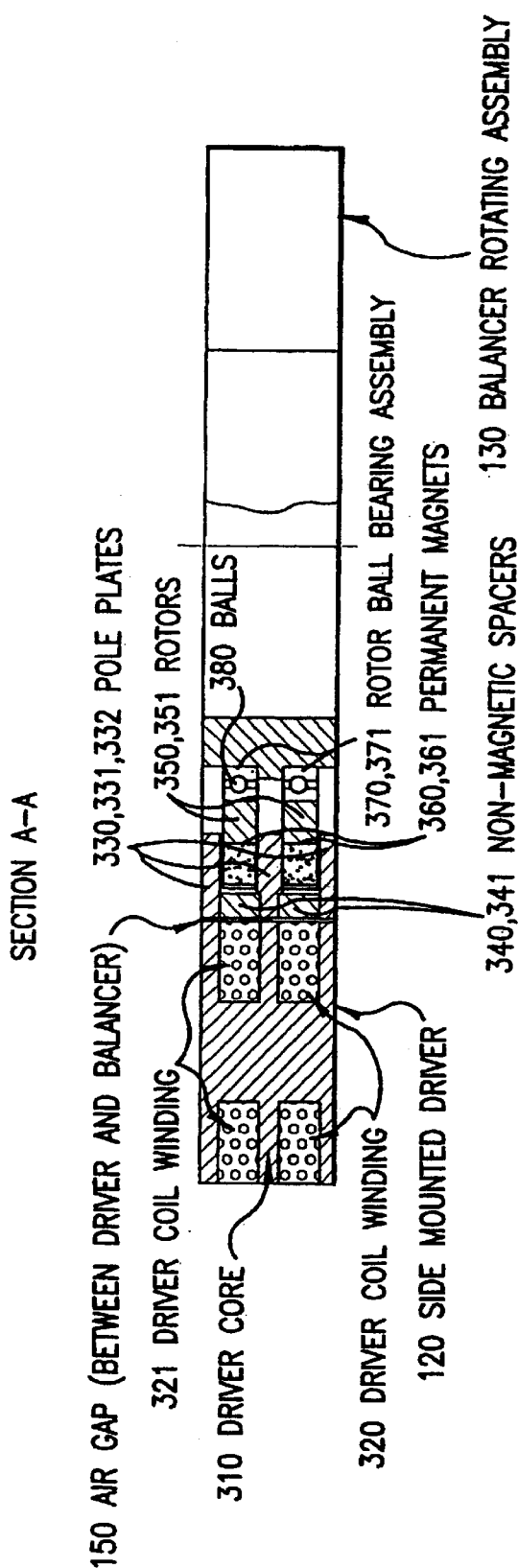
FIG. 3 is a side and partial cut-away view of the balancer shown in FIG. 1.

Referring now to FIG. 3, there is shown a partial cross-section view of the invention embodiment shown in FIG. 1. A section view of the side-mounted driver 120 shows a driver coil core 310 and two independent electrical coil windings 320 and 321. The driver core 310 comprises magnetic material and acts to concentrate and enhance magnetic flux generated when electric current passes through the coil windings 320 and 321. The driver core 310 could be made from a single piece of magnetic material or consist of an assembly of components. Coil windings 320 and 321, in the preferred embodiment of the invention, comprise mutually insulated electrical wire wound in a manner so as to form two substantially independent coils. The direction of current flow is orthogonal to the plane of the paper as seen in FIG. 3. When current is passed selectively through these windings, an electromagnetic field is generated which moves assemblies 350 and 351 to accomplish balance compensation. This process will be further explained later in this document.

As is further shown in FIG. 3, in one embodiment, rotating assembly portion 130 includes the assembled combination of generally circular and substantially similarly shaped pole plates 330, 331, and 332 which are separated by generally circular and mutually similarly shaped non-magnetic and preferably non-electrically conductive spacers 340 and 341. Spacers 340 and 341, in the preferred embodiment of the invention, would comprise axially symmetric annular aluminum or stainless steel rings of rectangular cross-section. The rectangular cross-section of the spacers should have sides about ¼ inch long. The outer radius of the spacers should be substantially similar to the outer radius of the pole plates 330–332. Situated between, and in non-contacting proximity to the pole plates 330–332, are rotors 350 and 351. The plates 330–332, spacers 340–341, and rotors 350–351 may also have different geometric shapes from those shown and described with reference to FIG. 3. However, in one embodiment of this invention, plates 330–332 should all be approximately the same size and shape. Spacers 340–341 should also have mutually similar geometry, as should rotors 350–351. The rotor geometry, however, is modified so that each rotor is unbalanced about it's own centerline. As will be discussed, driver 120 electromagnetically causes the rotors 350–351, and their accompanying "heavy spots", to rotate with respect to the machine reception portion 130 in accordance with stored control software and in accordance with certain measured quantities.

Figure 4:
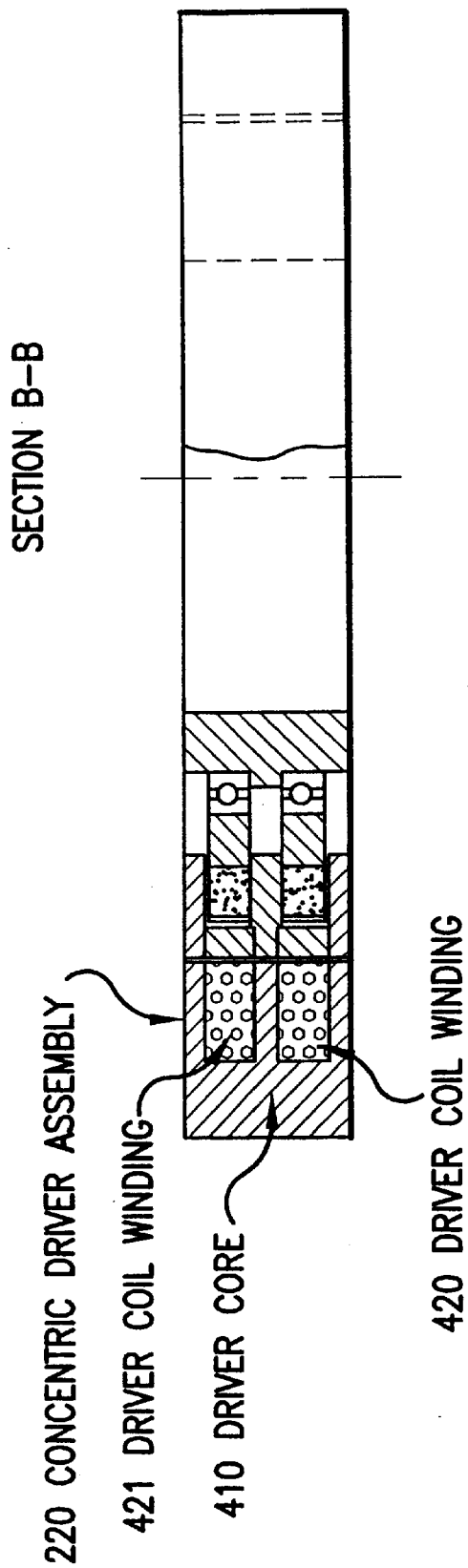
FIG. 4 is a side and partial cut-away view of the balancer shown in FIG. 2.

A second embodiment of the invention is shown in FIG. 4. A cross-section view shows the concentric driver 220 previously described and shown in FIG. 2. The driver core 410 enhances the magnetic field generated when current is passed through either driver coil winding 420 or 421. It should be apparent to one of ordinary skill in the art that, aside from the driver portion 220 of the invention, the remaining components shown in FIG. 4 can be essentially similar to those described with reference to FIG. 3.

It should also be apparent to one of ordinary skill in the art that, in the preferred embodiment of the invention, rotor 350 is substantially similar in structure and operation to rotor 351 and that pole plate 330 is also substantially similar in structure and operation to pole plates 331 and 332. For this reason, the following discussion will center around the combination of rotor 350 and pole plates 330 and 331. However, it should be realized that the following discussion is equally applicable to rotor 361 and pole plates 331 and 332.

Rotor 350, in the preferred embodiment of this invention, has a substantially circular shape and is made or formed from stainless steel, aluminum, or some other desired and conventional non-magnetic material. Rotor 360 may have a diameter and width of desired and selected dimensions, but in the preferred embodiment of the invention, the diameter and width are respectively about six inches and about 0.25 inches. Furthermore, rotor 350 possesses a plurality of permanent magnets 360 and 361 which are equally spaced and peripherally mounted in the rotor, remote from opening 160. The permanent magnets 360–361 are mounted such that their magnetic polarity is oriented parallel to the machine axis of rotation and adjacent magnets have reverse polarity. As further shown, rotor 350 is suspended between pole plates 330 and 331 by a ball bearing assembly 370 which is effective to allow rotor 350 to move rotationally in relation to plates 330 and 331 in response to an applied magnetic field. In the preferred embodiment of this invention approximately forty-five substantially similar balls 380 are used in each ball bearing assembly 370 and 371, though different numbers of balls are acceptable. In the preferred embodiment of the invention, the movement of rotors 350 and 351 in a selective manner will correct for machine rotating imbalance and hence reduce or eliminate vibration at the machine rotating frequency. Such rotor movement, as discussed below, is accomplished by means of controller 140 in cooperation with driver 120, ball bearing assembly 370, pole plates 330–331 and permanent magnets 360–361.

Figure 5:
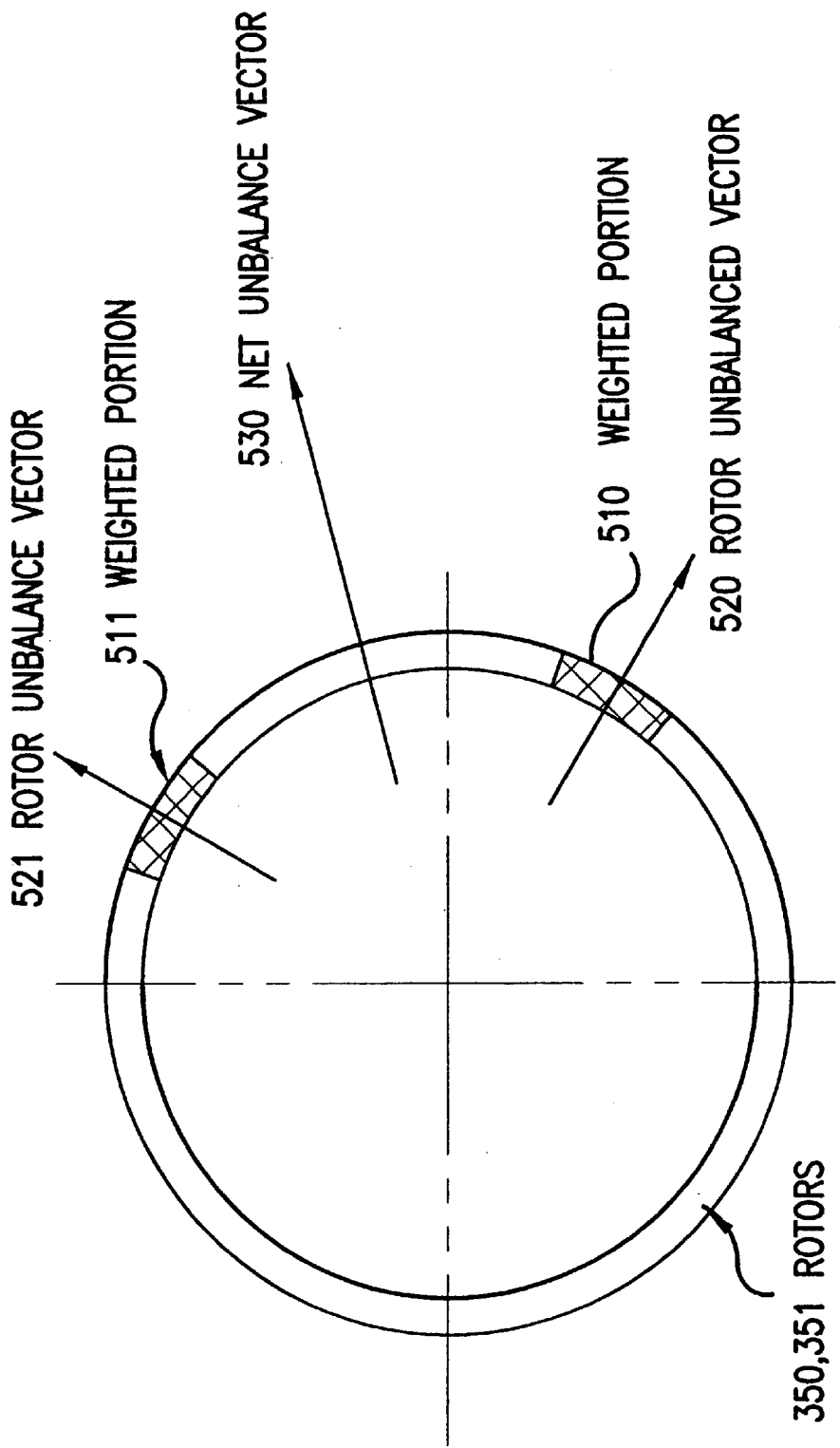
FIG. 5 is a diagrammatic view of the balancer rotors shown in FIG. 3 illustrating the balancing methodology of the invention.
Figure 6:
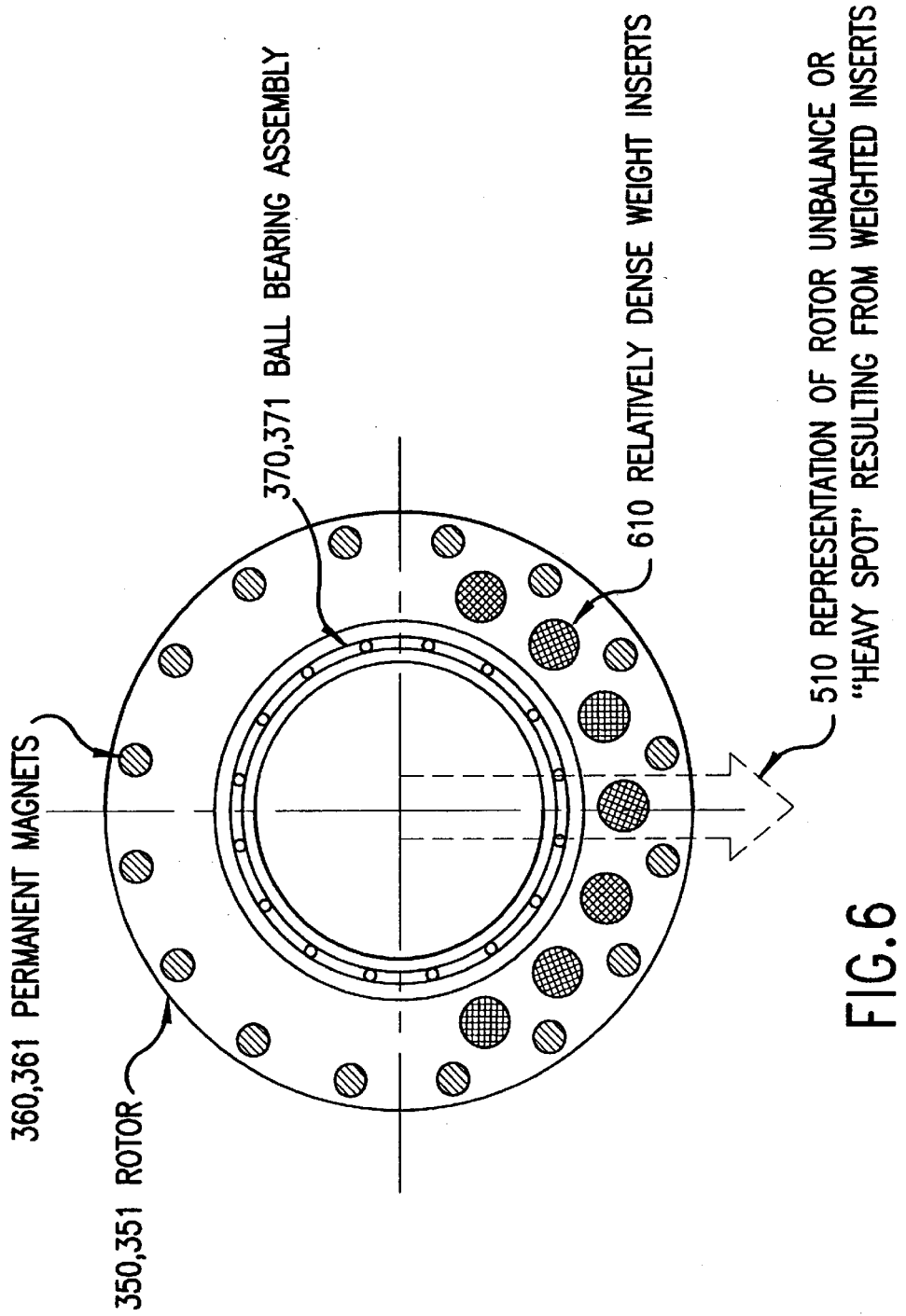
FIG. 6 is a front view of a rotor showing one possible configuration of weighted inserts which provide unbalance to the rotor.
Figure 7:
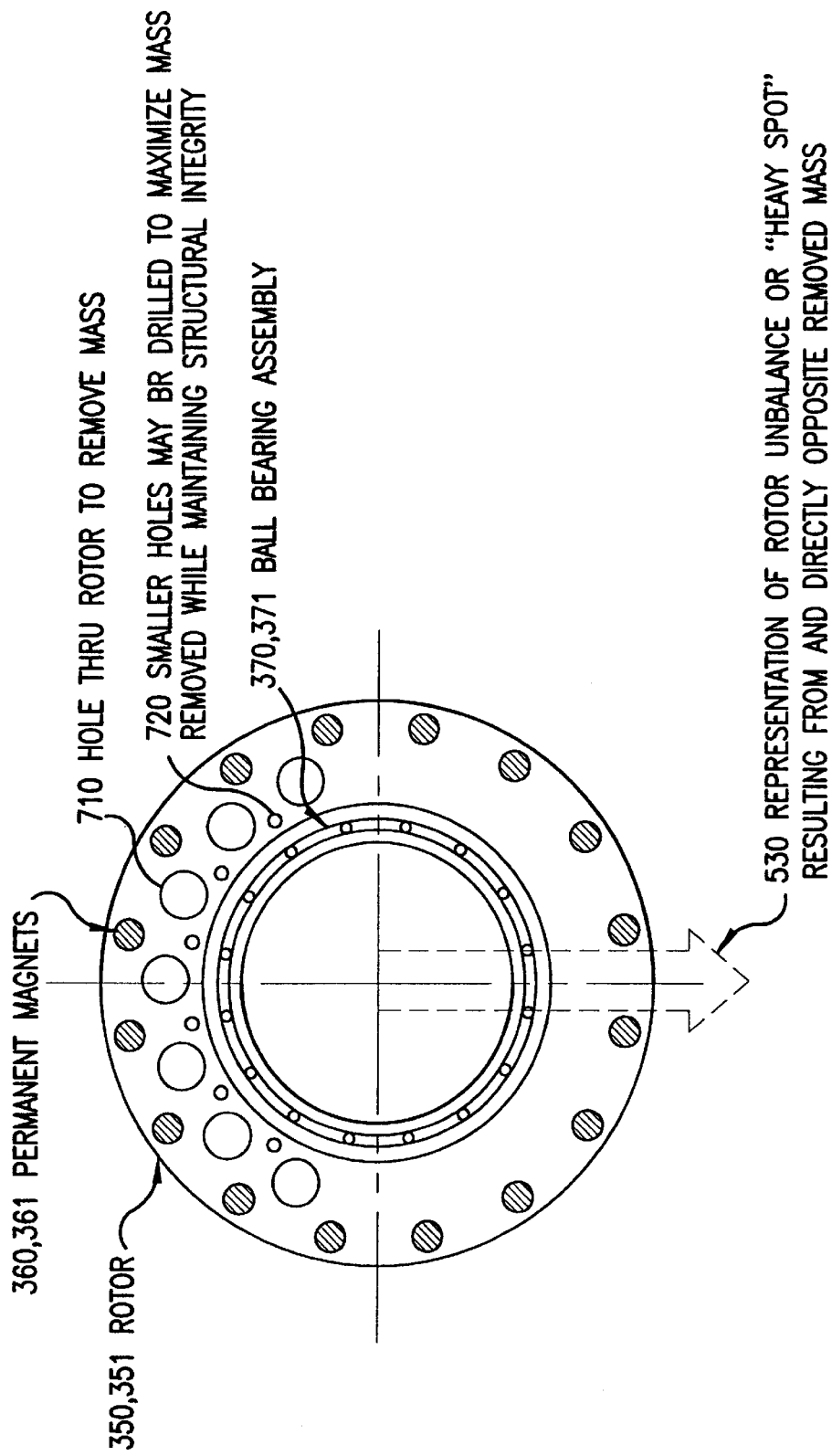
FIG. 7 is a front view of a rotor showing one possible configuration of machined holes which provide unbalance to the rotor.
Figure 8:
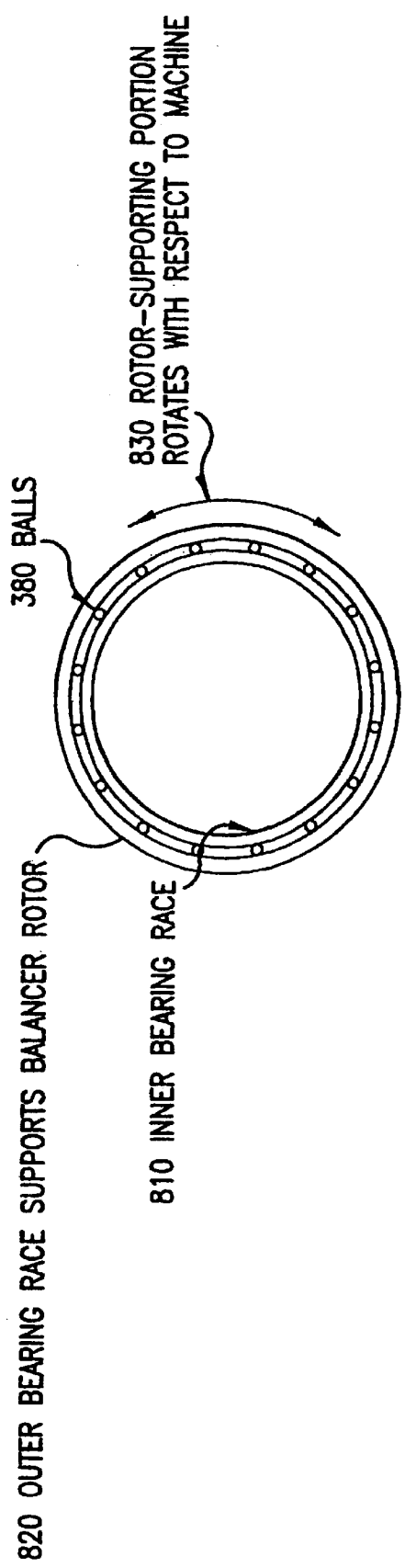
FIG. 8 is a front view of a ball bearing assembly mounted on the balancer rotating assembly and used to support the moveable rotors.

To understand such rotor movement imbalance correction, reference is now made to FIG. 5 which shows diagrammatic representations of rotors 350 and 351 and the respective rotor heavy or unbalance correction "spots". As shown, each of the rotors 350 and 351 include heavier portions 510 and 511 which produce to unbalance vectors 520 and 521. These unbalance vectors 520 and 521 mathematically combine to form the net imbalance correction vector 530. The net correction vector 520 may be calculated using trigonometry knowing the magnitudes and angular position of each rotor effective weight, or each rotor's individual "unbalance" vector. These weighted portions may be distributed along rotors 350 and 351 in any desired pattern. As FIG. 6 shows, the weighted portion for each rotor may, in one embodiment, consist of lead or other relatively dense material inserts 610 which are fastened within the individual rotors 350–351. Each insert 610 provides a vector having both a direction and an amplitude which is related to the position of rotor 350, 351 and the weight of the spot. The various vectors result in a rotor "heavy" spot 510. As shown in FIG. 7, the weighted portion may, in another embodiment, be introduced by machining holes 710 or otherwise removing material from portions of the rotors such that these portions are lighter than other rotor portions. The pattern of machined holes could, in one embodiment of the invention, include smaller diameter holes 720 which would allow increased mass to be removed from the rotor while maintaining structural integrity. Note that the rotors 350–351, in one embodiment of the invention, are mounted to the balancer rotating assembly 130 using ball bearing assemblies 370–371. FIG. 8 shows ball bearing assembly 370, which is substantially similar to 371. The inner bearing race 810 is mounted to the balancer rotating assembly 130. The outer bearing race 820 supports the rotor 350 or 351 allowing it to rotate as shown by reference 830 with respect to the balancer rotating assembly 130 with very little friction. The need to minimize dry friction is discussed later in this document. Bearing assembly 370, in one embodiment of the invention, is a commercially available ball bearing assembly substantially similar to a model KAO35CP0 bearing assembly manufactured by the Kaydon Corporation of Muskegon, Mich.

Figure 9:
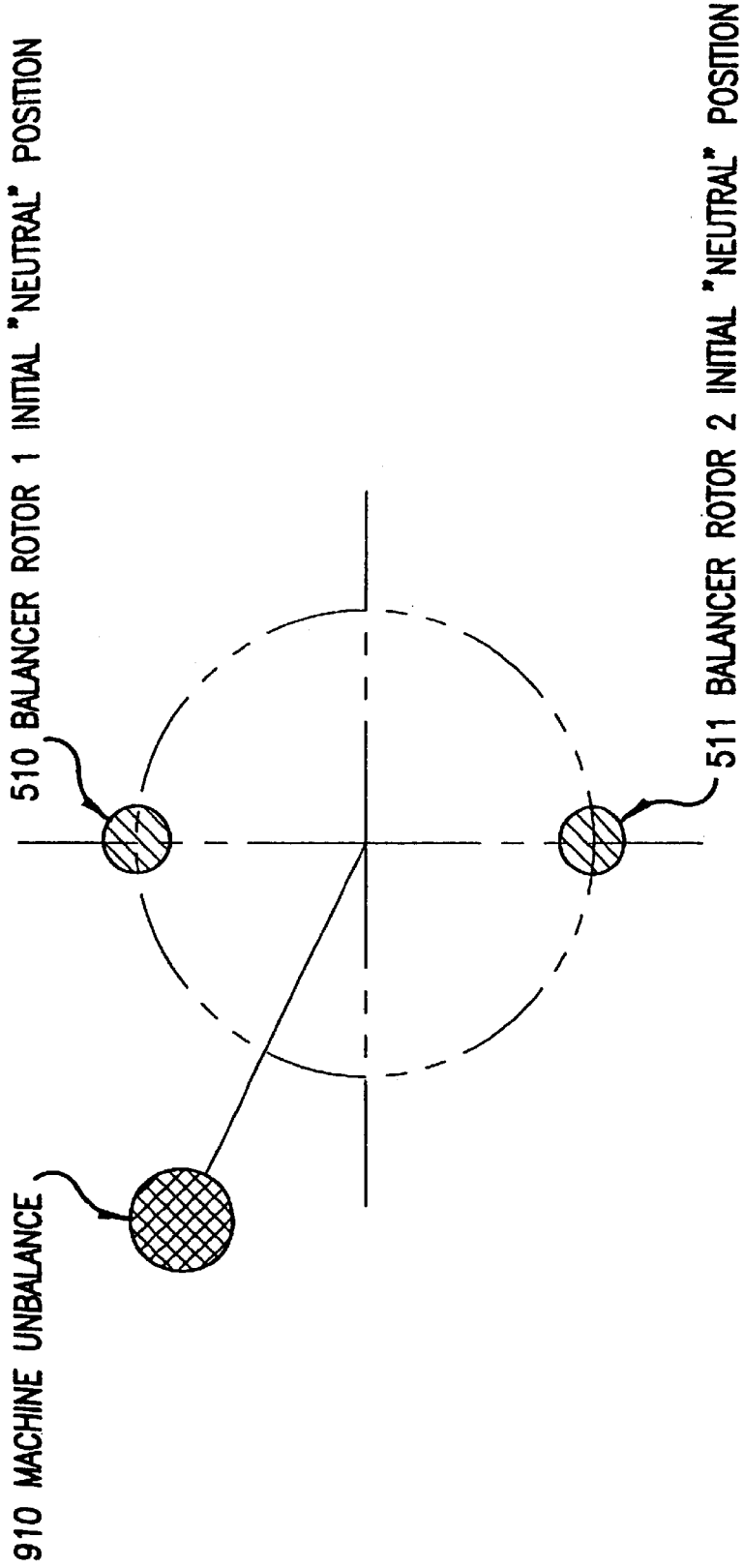
FIG. 9 is a diagrammatic representation of an initial neutral balancer configuration on an unbalanced machine.
Figure 10:
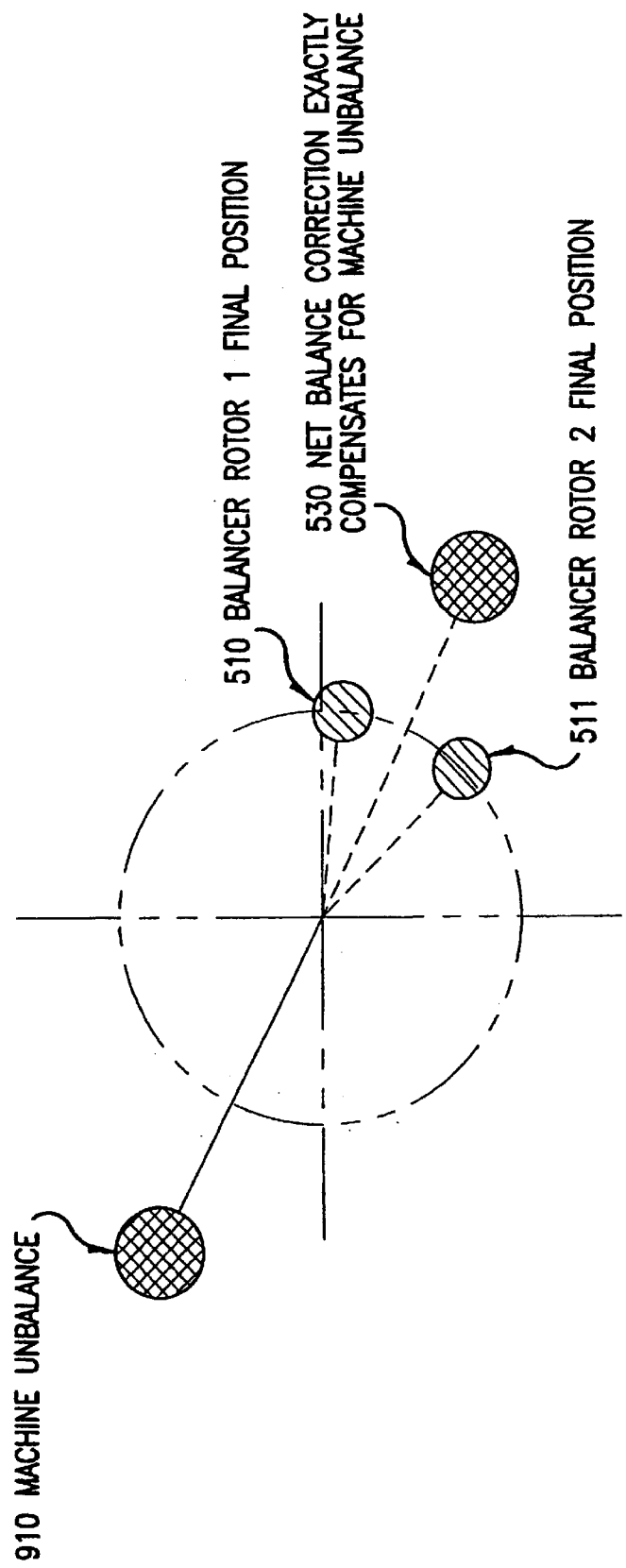
FIG. 10 is a diagrammatic representation of how, after balancing, the rotor unbalances combine to correct machine unbalance.

It should be realized that, to allow for maximum balancing capacity, balancer 110 should be balanced or "quiescent" about the machine axis of rotation except for the resultant moment 530 which is produced to provide the desired balance correction. Therefore, when the rotors are positioned opposite one another, the balancer rotating assembly, should be in static balance. FIG. 9 shows a diagrammatic representation of just such a "neutral" balance configuration. The rotor unbalances 510–511 can be initially positioned 180° opposite each to provide no effective balance correction. As will be discussed later, the controller 140 estimates the machine unbalance 910. The rotors 350–351 and their respective heavy spots 510-511 are then rotated by means to be discussed to the positions which provide the appropriate balance correction. This condition is diagrammed in FIG. 10. The rotor heavy spots 510–511 are placed so that the effective balance correction vector 530 is exactly opposite in position and the same magnitude as machine unbalance 910. This condition then results in a balanced machine, essentially eliminating a major source of machine vibration.

Figure 11:
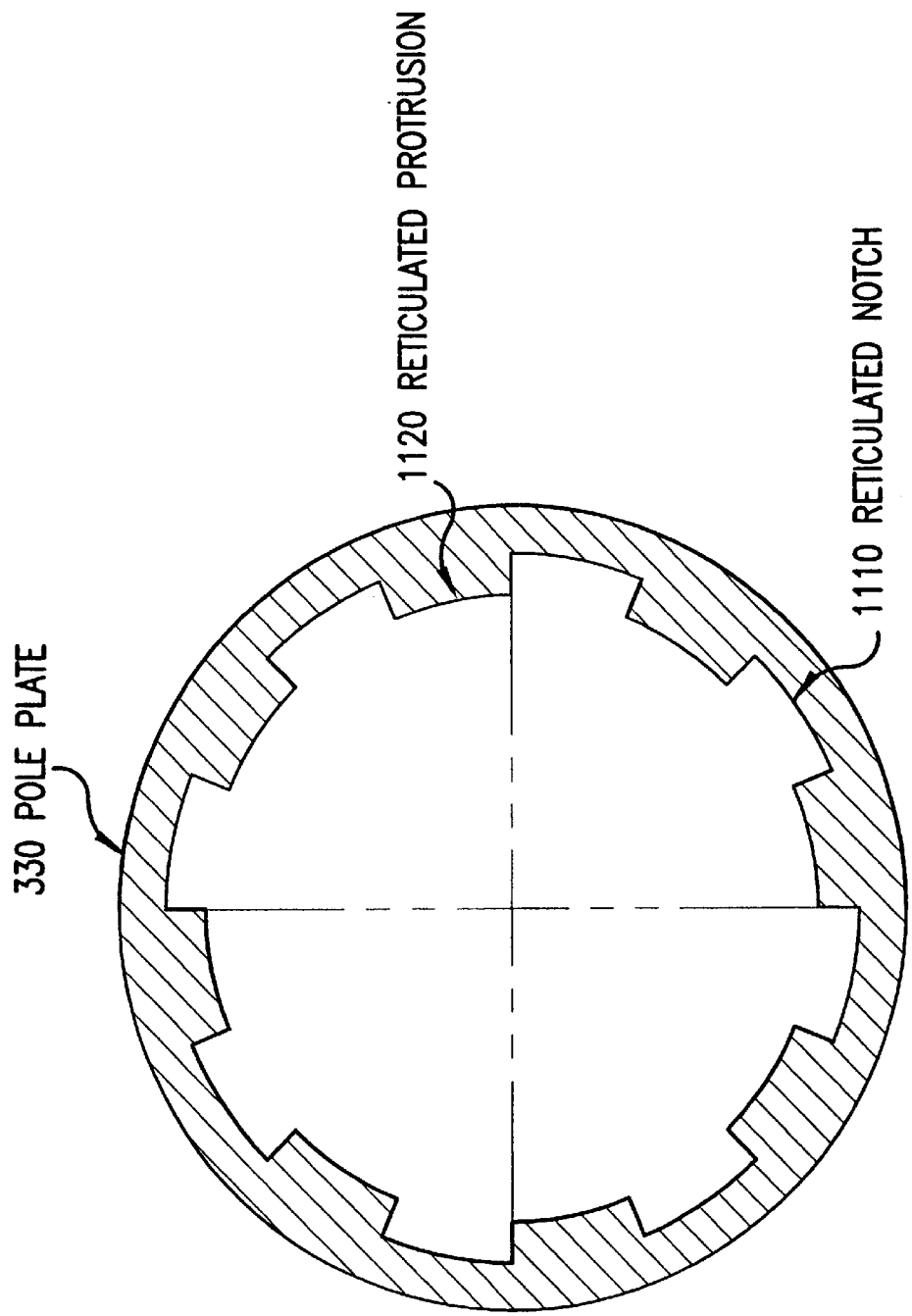
FIG. 11 is a front view of a reticulated pole plate used in the balancer.

A front view of pole plate 330 is shown in FIG. 11. Pole plates 330–332 are comprised of magnetic material. In the preferred embodiment of this invention they have a slightly larger outer diameter than rotor 350 and further have generally rectangular flanges or reticulated notches 1110 which are equally spaced around the inner circumference of the pole plate 330. The circumferential width of the notches are the same as the circumferential width of the protruding material 1120 which lies or is positioned between each notch. The pole plate reticulated notches 1110 normally cooperatively, frictionlessly, and magnetically receive the permanent magnet-containing rotor 350. The notches function to channel the permanent magnets' field so as to hinder the rotor from rotating. This effect means that the balancer rotors will resist "slip" even when unpowered by an external source, allowing the balance state to remain unchanged even when the rotating machine undergoes significant rotational acceleration.

Figure 12:
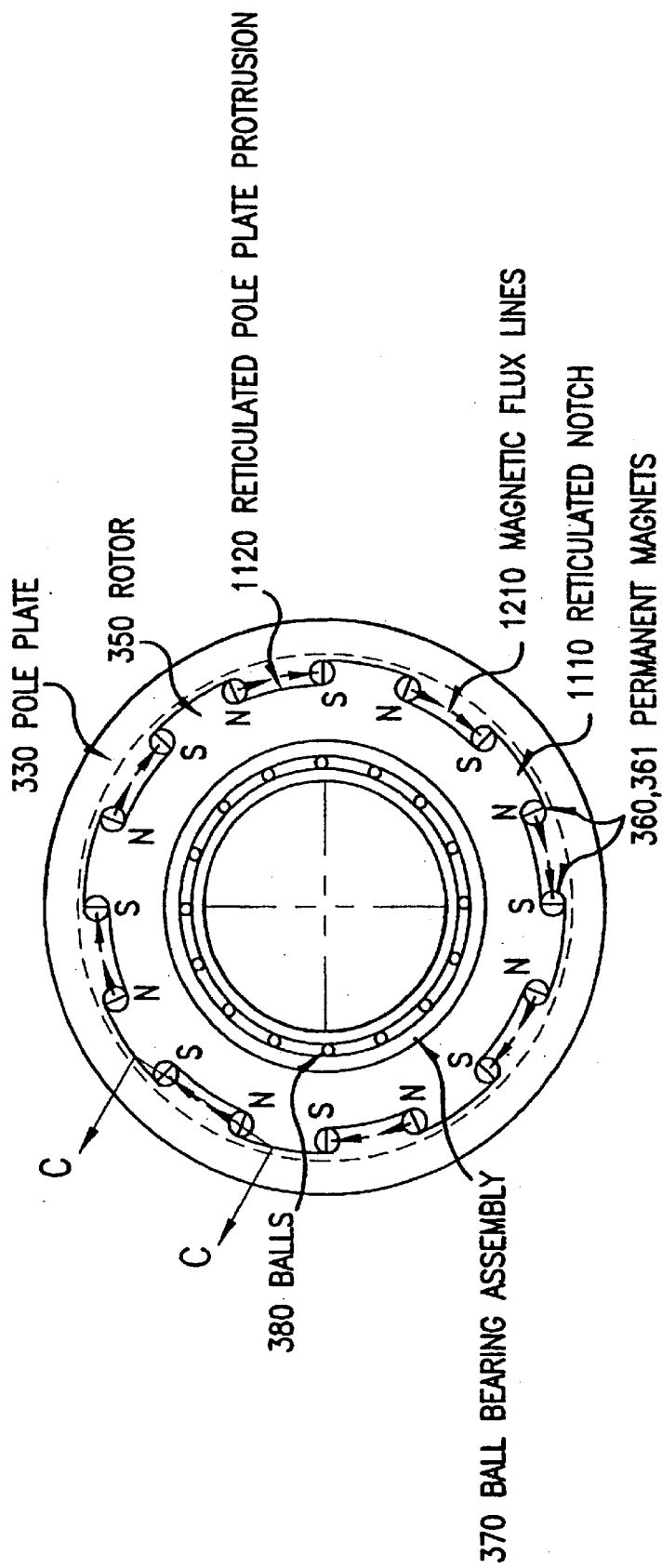
FIG. 12 is a front view of the balancer assembly showing the alignment of the rotor permanent magnets with the reticulated pole plate at a detent position of the rotor.

FIG. 12 shows the stable equilibrium position of the rotor 350 with its permanent magnets 360–361 aligned with the edges of each pole plate notch 1110. Note that the magnets are mounted with alternating polarity. The arrows 1210 in the figure represent the path of magnetic flux from one magnet across the pole plate protrusion 1120 to the adjacent magnet. As is further shown in FIG. 13, a cross-section of a single magnet pair and pole plate protrusion pair, the permanent magnet pair 360–361 normally drives a magnetic circuit formed by facing plate protrusions 1120–1121 and permanent magnet pairs 360–361. The magnetic circuit flux lines 1210 are represented by arrows in FIGS. 12 and 13. The configuration of magnets 360–361 relative to the pole plate protrusions 1120–1121 represents the stable equilibrium position of the rotor. Since magnetic circuit reluctance is minimized in this rotor position, any angular perturbation of the rotor will result in a torque on the rotor acting to restore it to the stable equilibrium position and, therefore, resist rotor slip.

While the geometric shape of the notches is generally rectangular, it should be realized that other shapes are possible and/or desirable, including circular or elliptical shapes. In the preferred embodiment of this invention, there are 16 such notches and the pole plates are separated from the rotor surfaces by about 0.10 inch. In the preferred embodiment of this invention, the middle or center pole plate 331 has notches similar to the other two pole plates 330 and 332. In another embodiment of this invention, plate 331 has no notches and could be a solid piece of magnetic material such as structural steel. The absence of notches in the center pole plate 331 would decrease the maximum resistance to rotor slip by approximately two times.

When the driver 120 is energized, a time-varying magnetic field is induced in the pole plates 330–332 and magnets 360–361. In the preferred embodiment of this invention, each of the pole plates 330, 331, and 332 are made of steel or a steel laminate to reduce eddy current losses due to this time-varying magnetic field. It is the permanent magnet flux circuit 1210 which is selectively interrupted by this driver flux, causing movement of the magnets and rotors.

Figure 14:
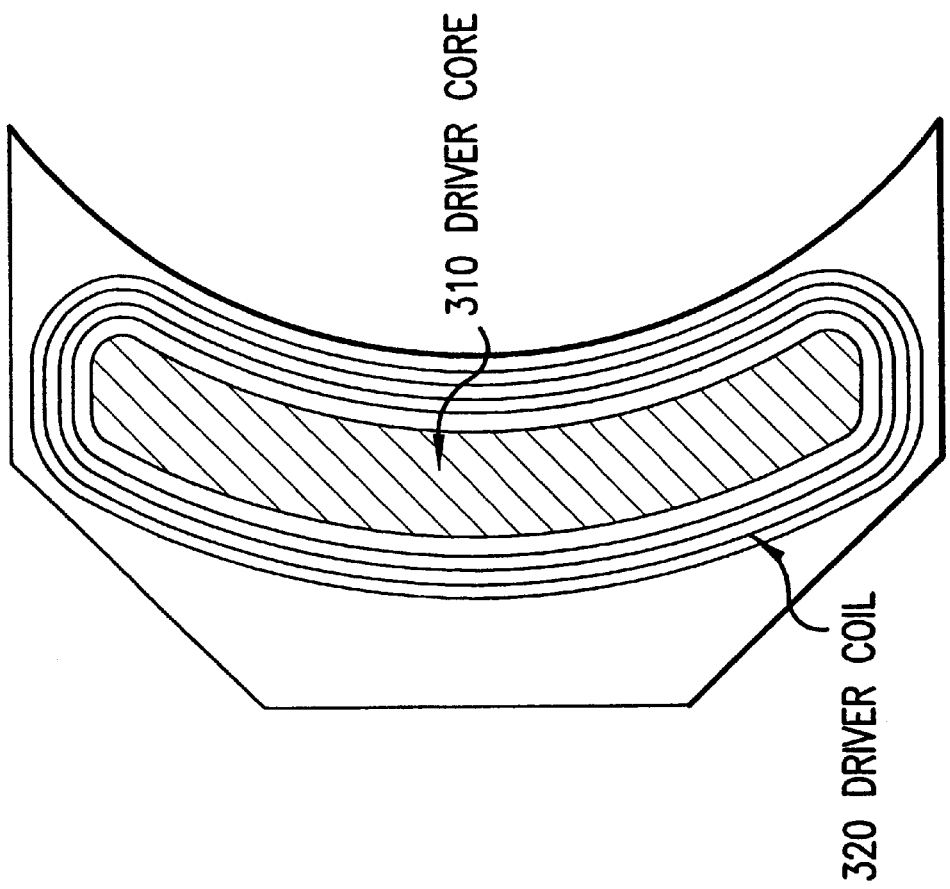
FIG. 14 is a front and partial cut-away view of the driver shown in FIG. 1.
Figure 15:
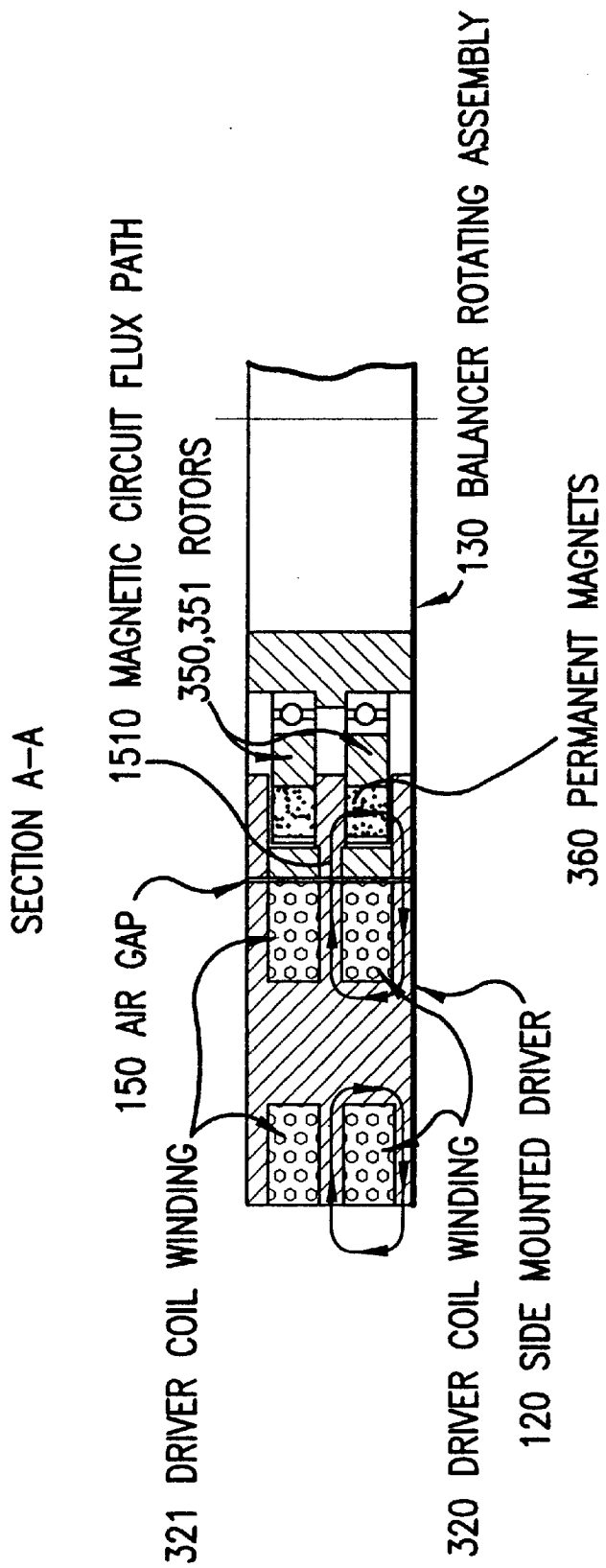
FIG. 15 is a side and partial cut-away view of the balancer and driver seen in FIG. 1 showing the driver magnetic field flux path.

FIG. 14 shows a side cross-section view of the "C" shaped side-mounted driver 120. The side-mounted driver 120, in one embodiment of the invention, is be about 1.5–2.0 inches thick in the direction radially away from the machine centerline and approximately the same axial thickness as the balancer rotating assembly 130. This view further illustrates the way that the driver coil 320 is wound around the driver core 310. When the coil is energized, magnetic flux is generated. FIG. 15 is a cross-section view similar to FIG. 3, but showing the magnetic flux path 1510 generated when a single coil winding 320 is energized. The magnetic flux crosses the air gap 150 between the side-mounted driver 120 and the balancer rotating assembly 130, and passes through the permanent magnets 360. Each coil winding 320–321 can be independently energized, effecting magnetic circuits passing through either rotor 350–351.

Figure 16:
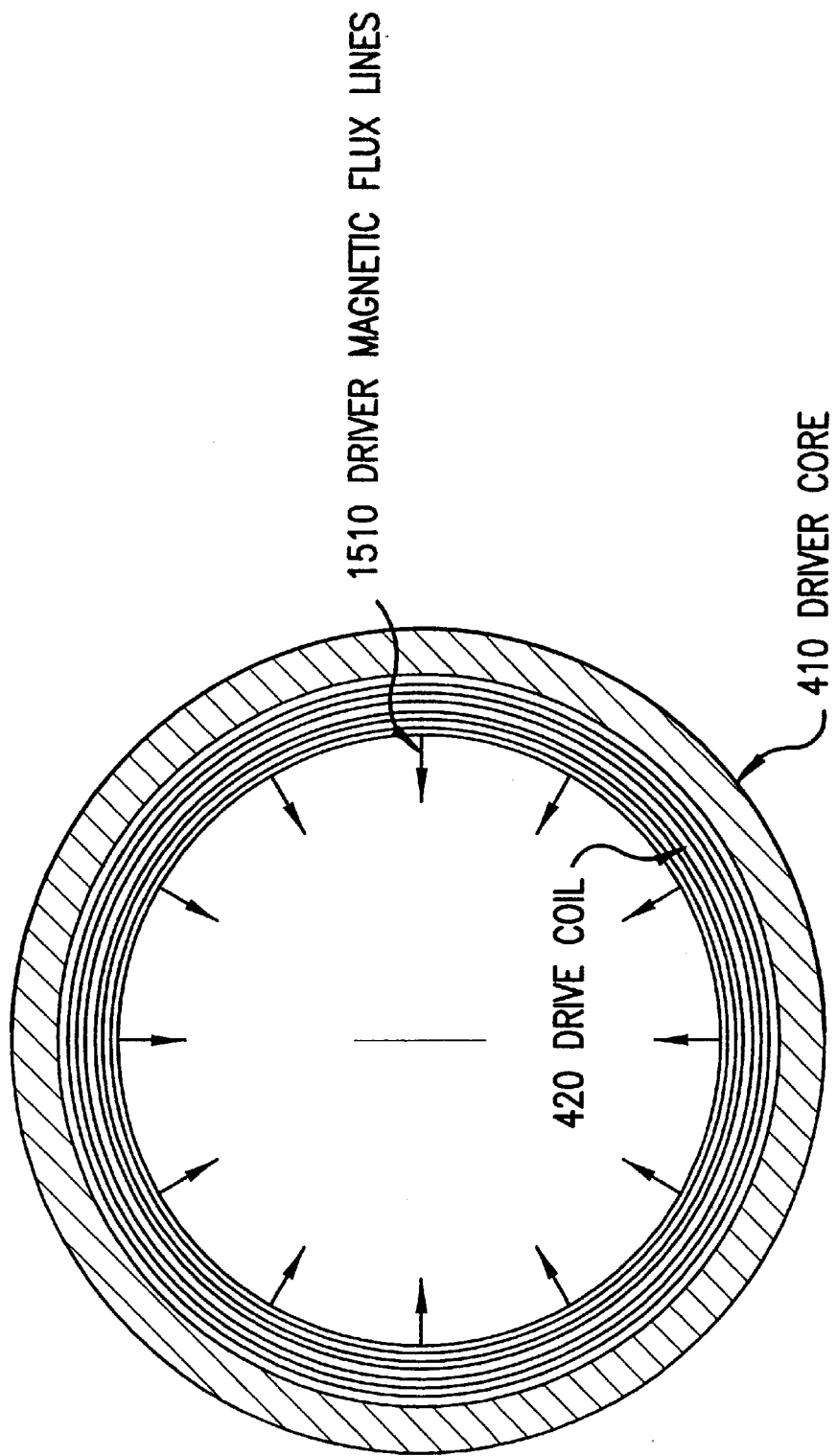
FIG. 16 is a front and partial cut-away view of the driver shown in FIG. 2.
Figure 17:
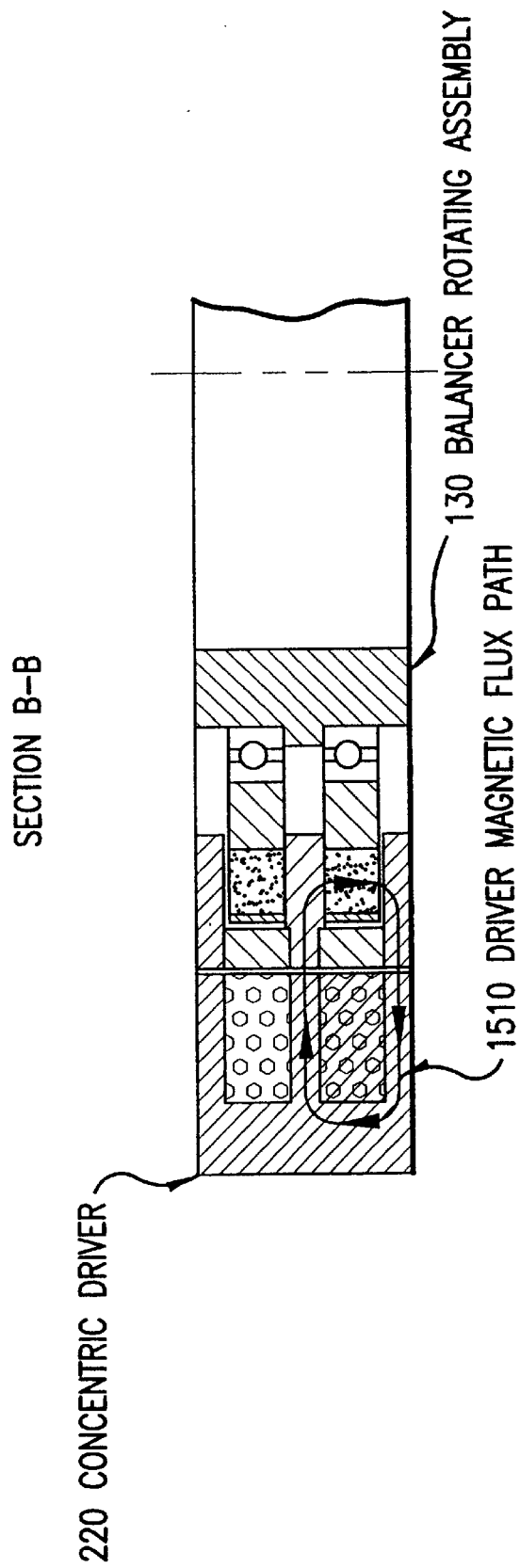
FIG. 17 is a side and partial cut-away view of the balancer and driver seen in FIG. 2 showing the driver magnetic field flux path.
Figure 21:
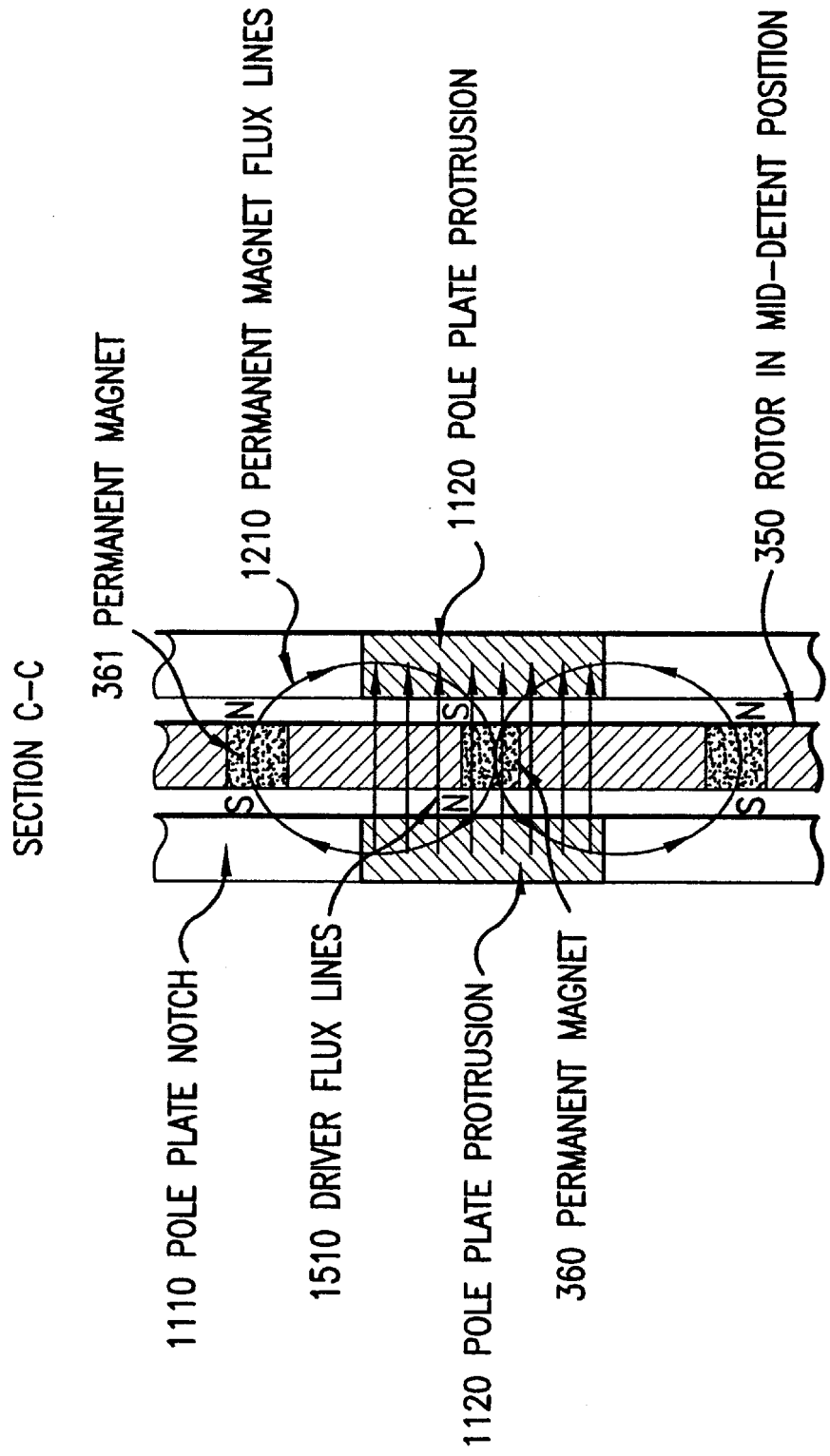
FIG. 21 is similar to FIG. 13 and illustrates the interaction of the driver magnetic field and the permanent magnet field when the rotor is at an unstable equilibrium mid-detent position.

Since a portion of the total magnetic flux is induced to pass through the air away from the balancer rotating assembly 130, the side-mounted driver 120 is less efficient electromagnetically than the concentric driver 220. Furthermore, since approximately the same magnetic flux must pass through a smaller volume of core in the side-mounted driver than the concentric driver, there is a greater chance of magnetic saturation in the side-mounted driver core material. Therefore, the concentric driver is more desirable in applications which, because of geometric or other constraints, do not require the side-mounted driver configuration. A cross-section view of the concentric driver 220 is shown in FIG. 16. Also shown are the magnetic flux lines 1510 induced by the drive coil 420 parallel to the plane of the page. The concentric driver core 410 is, in one embodiment of the invention, about one inch thick in the radial direction and has substantially the same axial thickness as the balancer rotating assembly 130. The corresponding section view of the concentric driver 220 interacting with the balancer rotating assembly 130 is shown in FIG. 17. Note that the flux path 1510 crosses to the rotating assembly 130 and through the permanent magnets similar to that shown in FIG. 21. The concentric driver 220 is more efficient electromagnetically, however, than the side-mounted driver 120 since a greater percentage of the total magnetic flux is able to interact with the permanent magnets.

Figure 13:
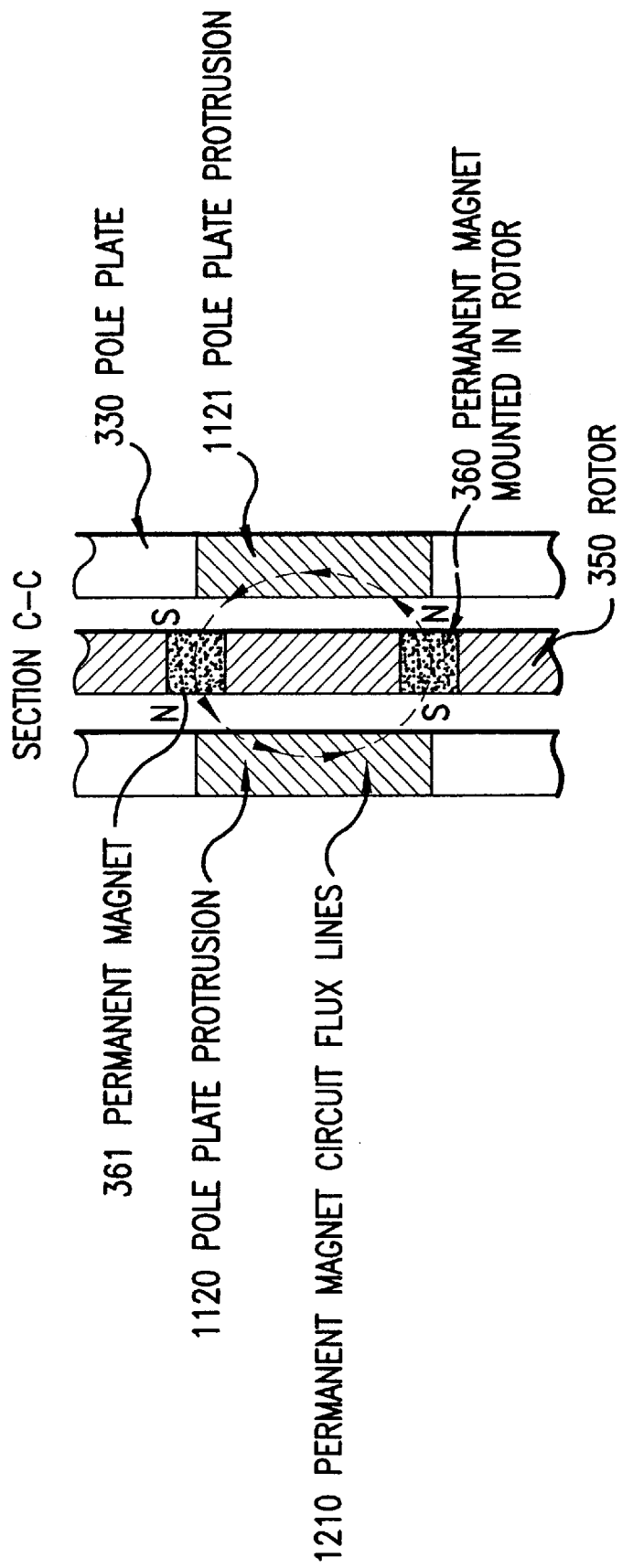
FIG. 13 is a partial cut-away view of the pole plates and rotor seen in FIG. 12 showing the permanent magnet flux path.
Figure 18:
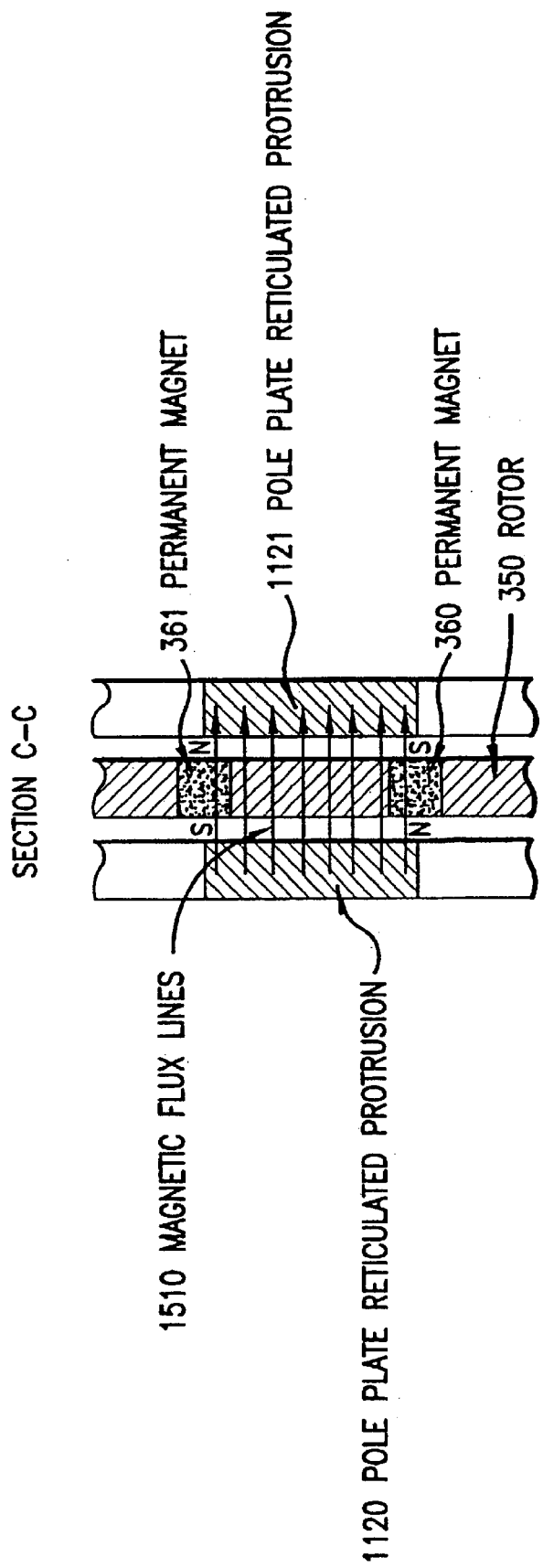
FIG. 18 is similar to FIG. 13 and shows an additional view of the driver magnetic field flux path.
Figure 19:
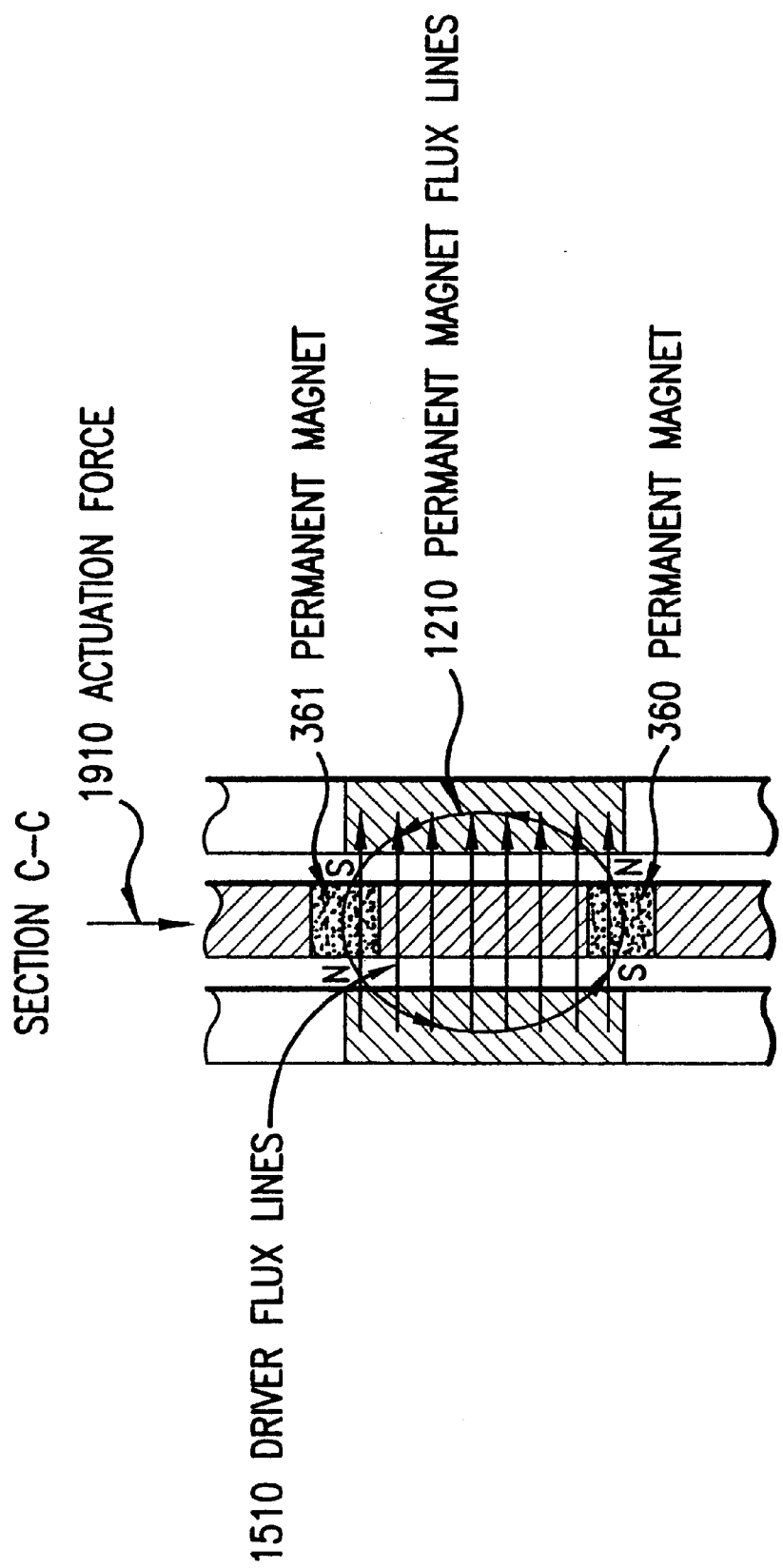
FIG. 19 is similar to FIG. 13 and illustrates the interaction of the driver magnetic field and the permanent magnet field.
Figure 20:
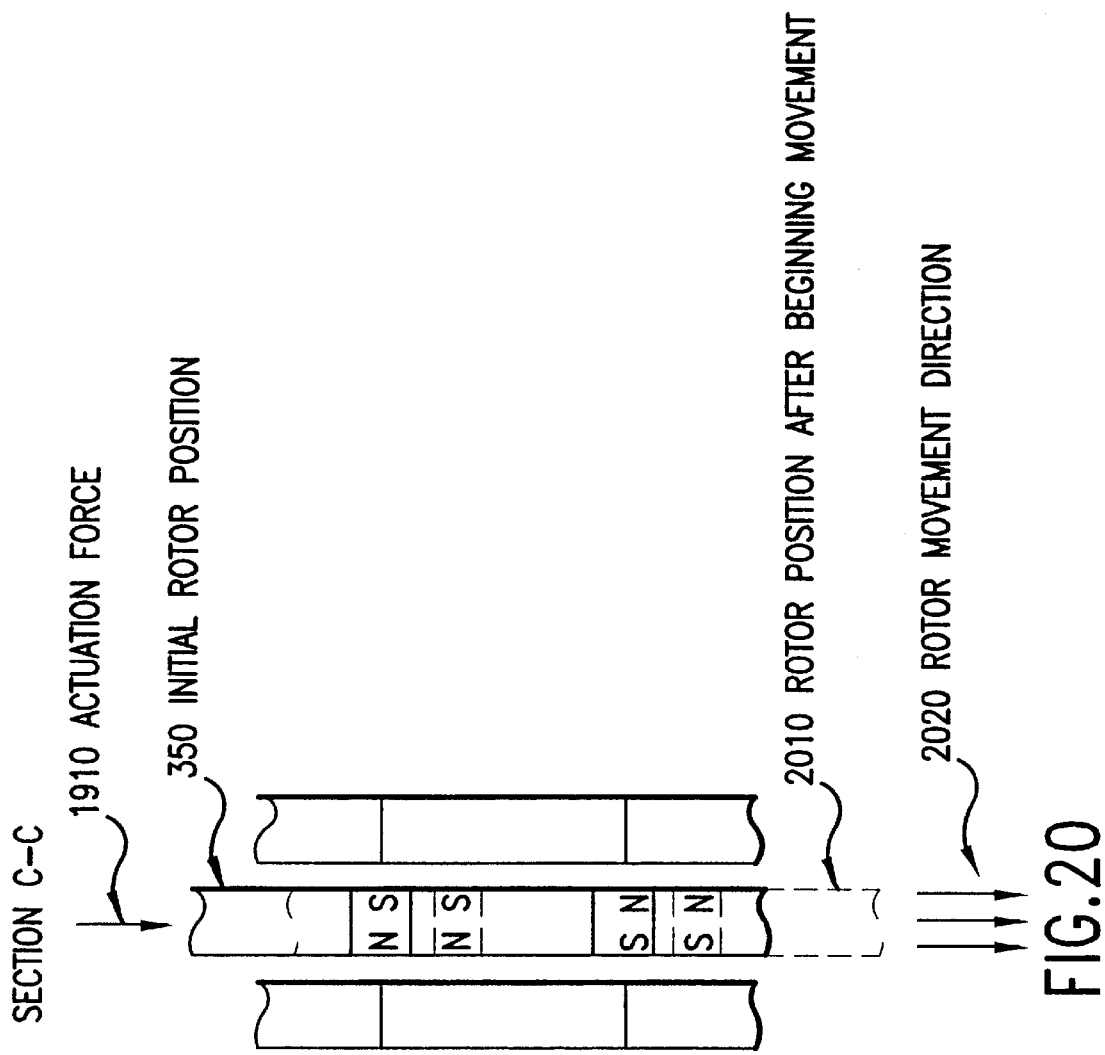
FIG. 20 is similar to FIG. 19 and shows how the rotor moves in the direction of the electromagnetically-generated actuation force.

FIG. 18 shows a section view similar to FIG. 13. FIG. 18, however, shows the flux path generated by either of the drivers 120 or 220. Magnetic flux 1510 flows between pole plate protrusions 1120 and 1121 and across the non-magnetic rotor 350 and permanent magnets 360–361. In FIG. 19, the magnetic flux 1510 from the driver 120 or 220 is shown juxtaposed on the flux 1210 due to the permanent magnets 360–361. As the two magnetic fields interact, the flux lines or fields of the upper portion of the circuit (e.g. at the bottom of magnet 361) generally cancel, but the flux lines or fields at the top of magnet 360 are additive. Such field interaction creates a force 1910 on the rotor in a direction perpendicular to the driver-generated magnetic field. This force is generated because the rotor is attracted to a position which maximizes magnetic flux density while minimizing magnetic reluctance. Such a position is found when the magnet 360 is aligned with the midpoint of a pole plate protrusion 1120 and the magnet 361 is aligned with the midpoint of the pole plate notches 1110. FIG. 20 illustrates the intermediate new position 2010 of rotor 350 as it moves in the direction 2020 of the electromagnetically-generated actuation force 1910. Once the driver field is removed, a mid-notch position becomes unstable. Thus, the dynamics of the rotor are governed by the forces caused by the interacting driver and permanent magnetic fields when the driver is energized, and when the driver is not energized, the-permanent magnets alone, which tend to restore the rotor to a stable equilibrium position. This stable position is where the magnets are aligned with the edges of the pole plate notches as shown in FIG. 12.

It is theoretically possible that, in rare situations, the rotor may become "stuck" in an unstable equilibrium position. FIG. 21 again shows that driver magnetic field 1510 and permanent magnet field 1210 as in FIG. 19. The rotor, however, is in a "mid-detent" position where the magnets 360–361 are aligned with the midpoint of the pole plate notches 1110 or protrusions 1120. Since the rotor is already at the stable equilibrium for the energized coil condition, there will be no torque on the rotor due to the driver coil field. When the driver coil is not energized, the rotor is then in an unstable equilibrium position. There will be no net torque on the rotor as long as it remains exactly at the "mid-detent" position. If the rotor is perturbed from the position, however, it will rotate to a stable equilibrium where its magnets are aligned with the edge of a pole plate notch. The greater the "Coulomb" or "dry" friction in the rotor bearing, the greater the possibility of the rotor becoming stuck at the mid-detent position. Therefore, it is advantageous to minimize the amount of dry friction in the rotor bearing. If the rotor were to become stuck, the balancer could be rotationally accelerated to nudge the rotor enough to cause it to return to the stable equilibrium position. Furthermore, in many cases, a small driver coil excitement pulse could be used. Given that there would be small imperfections and asymmetries in the permanent magnet and pole plate material, a small pulse could generate a small torque on the rotor to displace it from the unstable equilibrium. As will be discussed later in this document, however, it is also advantageous to have a certain amount of viscous fluid friction present to act on the rotor. First, however, an understanding is required of how electrical pulses through the driver coil cause the rotors to move.

Figure 22:
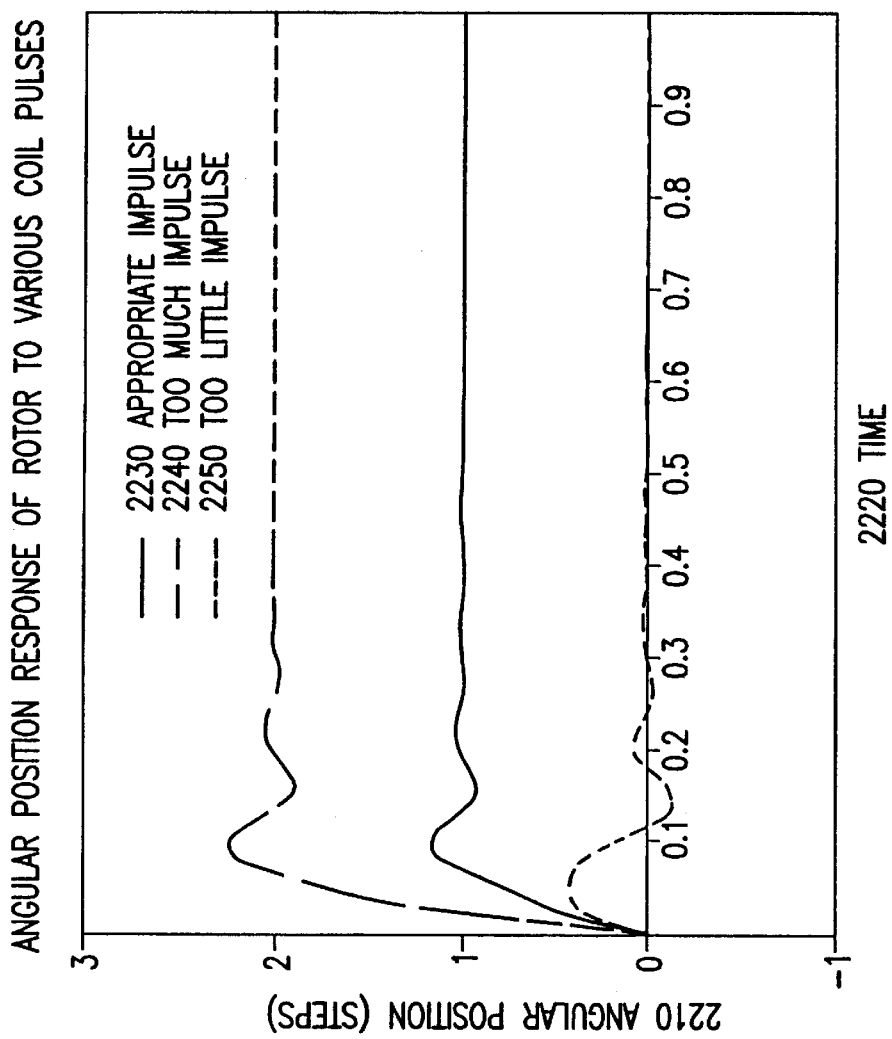
FIG. 22 is a graph of balance rotor angular position with respect to time showing the rotor response to three different driver coil energy pulses.

The driver excitation pulse, in the preferred embodiment of this invention, is relatively brief in duration and is on the order of time that it takes for the rotor to move from one reticule to the mid-reticule position. Beyond this position, the coil driver-induced force acts in an opposite direction, attempting to return the rotor to the mid-detent position. The electrical pulse must be of the appropriate magnitude and duration to cause a torque which will impart the rotor momentum required to allow the rotor to step into the next detent position and not beyond. The change in momentum of the rotor is caused by imparting an impulse. This concept is illustrated mathematically by the equation $$\text{Impulse}=\text{change in momentum}$$

or $$\int F dt = m \Delta v \qquad \text{eq. 1}$$

where
 F=Force
 t=time
 m=mass
 Δv=change in velocity
The corresponding rotational relationship is $$\int T dt = I \Delta \overline{\omega} \qquad \text{eq. 2}$$

where
 T=Torque
 t=time
 I=rotational mass moment of inertia
 Δω̄=change in angular velocity If not enough impulse is provided, the rotor will settle again into its original position. If too much impulse is furnished, the rotor will have too much momentum and will skip a detent. An example of each of these cases is shown in FIG. 22. The plot shows the rotor angular position 2210 on one axis versus time 2220 on the other axis. The impulse provided by the driver coil current should reliably cause the rotor to step one position such as the "just right" case 2230 shown in FIG. 22. Curve 2240 is the rotor response after "too much" impulse has been applied by the driver to the rotor. Curve 2250 shows how the rotor will simply settle back into its original position when not enough impulse is supplied. Since each balancer may have different rotor inertial characteristics, durations and magnitudes of the coil pulses will need to be modified for each balancer design.

In one embodiment of the invention, viscous fluid would be sealed inside the balancer rotating assembly. This fluid would provide viscous frictional damping to the rotors. The presence of viscous friction, while increasing the required coil energy to actuate the rotor, also increases the reliability of rotor actuation by allowing a wider range of driver impulses to cause successful rotor actuation. In the absence of any friction, the rotor would, upon actuation, continue to move forever since no energy would be lost from the system. Friction, therefore, is required to remove energy from the rotor, causing it to settle in the next detent position without overshooting to the following step position. "Dry" friction is not desirable because of the tendency for it to increase the probability of the rotor getting "stuck" as discussed above. Viscous, or "wet" frictional damping provides a torque on the rotor as a function of rotor angular velocity. This would not cause the rotor to "stick" in its unstable equilibrium position. There is a range of impulse magnitude which would actuate the rotor successfully into the next detent position without causing it to "skip" a step.

Figure 23:
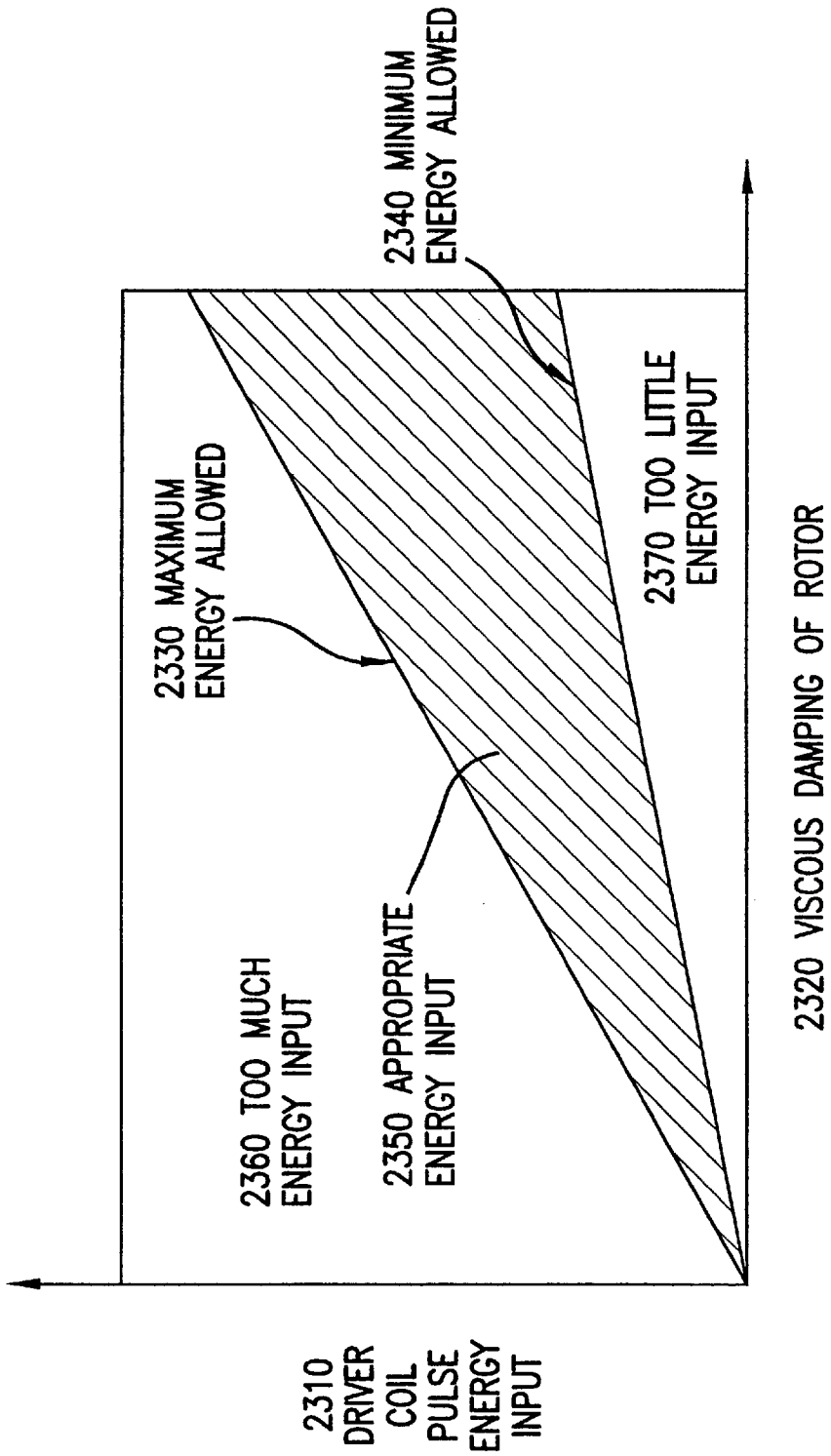
FIG. 23 is a graph of driver coil pulse energy versus viscous damping of the balancer rotor showing the range of driver coil pulse energies that will cause successful actuation of the rotor for varying viscous damping values.

Increasing viscous damping increases the range of impulses allowable and increases balancer reliability by making operation less sensitive to environmental and manufacturing variations. Increased reliability, however, comes at the cost of increase energy required since viscous friction dissipates energy from the system. FIG. 23 diagrams how increasing viscous damping increases the acceptable range of energy input. The figure shows a plot on axes of driver coil pulse energy input 2310 versus viscous damping of rotor 2320. Curves 2330 and 2340 represent the respective maximum and minimum driver coil pulse energy inputs which will cause successful rotor stepping. The area 2350 lying between the maximum 2330 and minimum 2340 curves represents the range of driver pulse energies which will cause successful rotor stepping. The areas 2360 and 2370 above below this range represent energies which will cause rotor "over-stepping" and "under-stepping" respectively. Note that the range 2350 of "allowable" energy inputs increases with increasing viscous fluid damping. Energy required for stepping, however, also increases with increasing viscous damping because damping dissipates system energy.

An appropriate trade-off between reliability and energy input required must be determined given the specifications of each balancer application. Once the appropriate compromise is defined, the viscous damping can be set by choosing the appropriate viscosity fluid.

Fluid viscosity is often highly temperature dependent. It is possible, therefore, that the balancer would operate less reliably in a relatively high temperature environment. In one embodiment of the invention, temperature sensors would provide feedback of the fluid temperature. Temperature-viscosity tables, determined experimentally a priori, would then be used to decrease driver coil pulse energy appropriately as temperature increased to allow continued reliable balancer operation.

Figure 24:
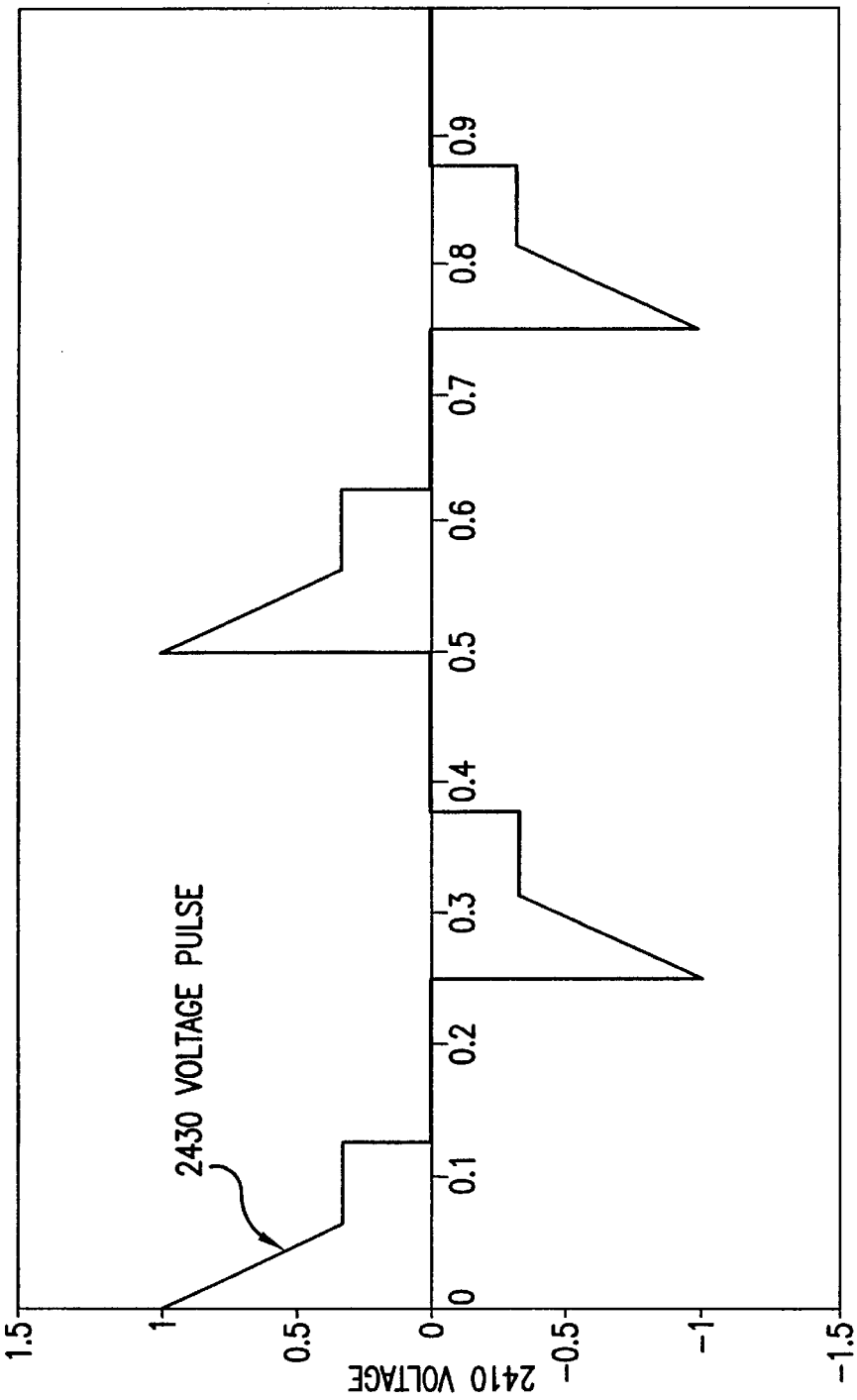
FIG. 24 is a graph of driver coil voltage versus time for one embodiment of the invention.
Figure 25:
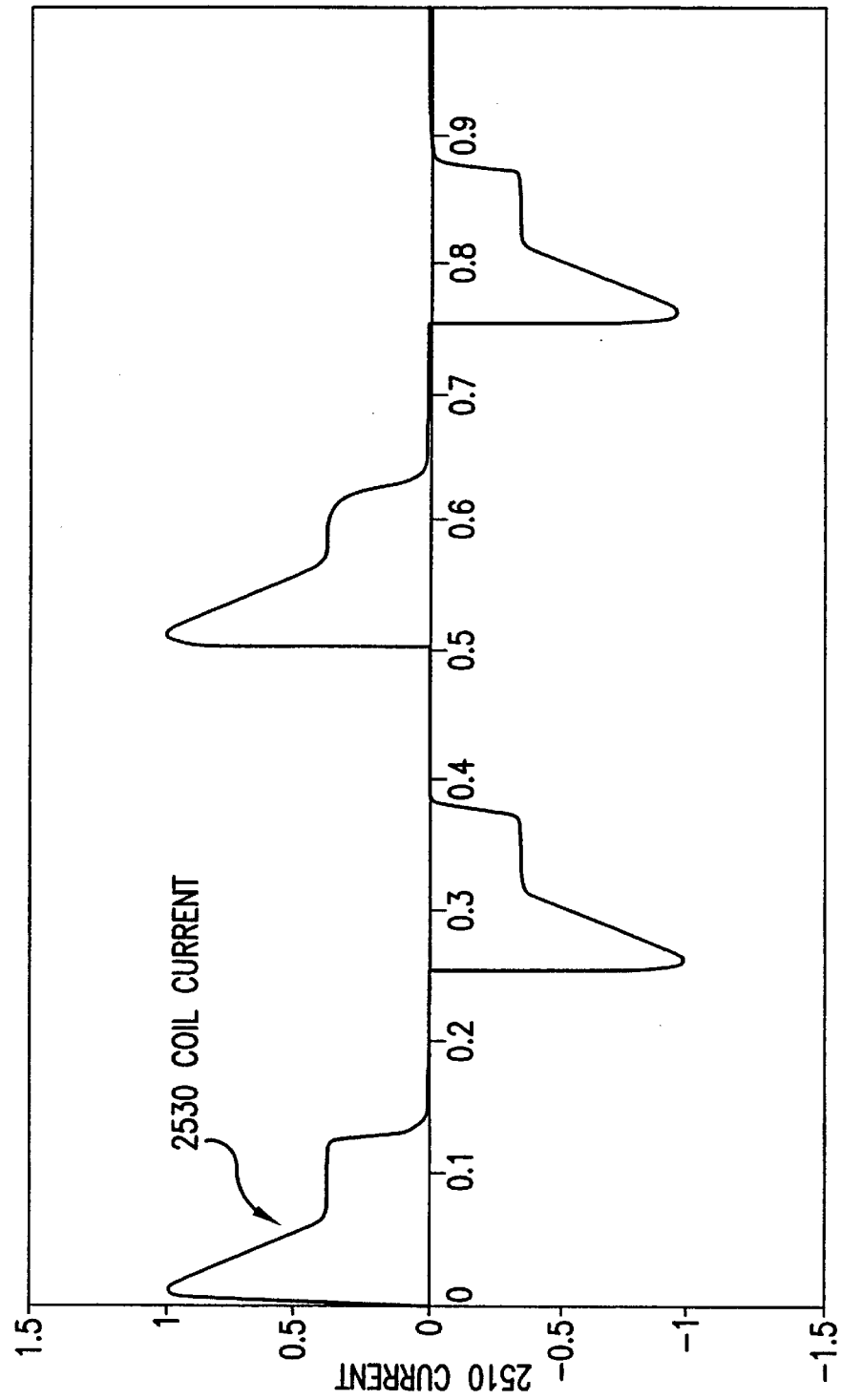
FIG. 25 is a graph of driver coil current versus time for one embodiment of the invention.

To obtain rotor actuation in a single direction for each step, the polarity of the driver pulses must be alternated. FIG. 24 shows an example of the "shape" of voltage pulses through the driver coil. FIG. 24 is a plot with voltage 2410 and time 2420 axes. Four driver voltage pulses 2430 are shown. Each pulse would cause the rotor to move one step. Note that the pulses indeed alternate in polarity to cause continued actuation in the same direction. FIG. 25 shows a plot on axes of current 2510 versus time 2520. The resulting driver coil current 2530 due to the voltage pulses is shown. The "rise-time" and decay characteristics of this current will, as should be apparent to one of ordinary skill in the art, be a function of applied coil voltage and coil impedance.

It should be known to those of ordinary skill in the art that the required amplitude of the driver pulse is nearly proportional to the square root of the restraining force, or slip resistance created by the magnetic engagement of the rotor magnets and pole plate notches. Such "detent force" or slip-resistance is governed by the following equation 3:

$$F_r = \left(\frac{1}{2\mu_0}\right) A B_r^2 \qquad \text{eq. 3}$$

Where:

$F_r$=Detent magnetic force

A=Cross-sectional area of the magnetic flux $B_r$=Detent permanent magnet-induced flux density $\mu_o$=Permeability constant for free space The following equation 2 gives the drive force required to displace the rotor from its detent position:

$$F_d = \left(\frac{1}{2\mu_0}\right) A B_r B_d \qquad \text{eq. 4}$$

Where:

$F_d$=Driver magnetic force applied to the rotor $B_d$=The driver magnetic field density Actuation only occurs when:

$$F_r = F_d \qquad \text{eq. 5}$$
$$B_r^2 = B_r B_d$$
$$B_d = B_r$$

$$I_d \equiv B_d = B_r \equiv \sqrt{\frac{F_r}{A}} \qquad \text{eq. 6}$$

Where:

$I_d$=Driver pulse current

From the equations, we see that, for example, if slip resistance is quadrupled by using a magnetic material with twice the flux density, the driver pulse current must be doubled.

This relationship of detent force to pulse amplitude (and accompanying driver flux density $B_d$) is especially relevant to pole plate magnetic saturation when using the side-mounted driver of FIG. 1 since it has less cross-sectional area for flux conduction than the concentric driver of FIG. 2. If material saturation problems are encountered, it may be necessary to reduce detent force in order to reduce driver flux density $B_d$ as indicated by Eq. 6. As an alternative, the same slip resistance may be retained by using a larger permanent magnet area A at reduced flux density $B_r$ which in turn reduces required driver flux density $B_d$ according to Eq. 6.

Figure 26:
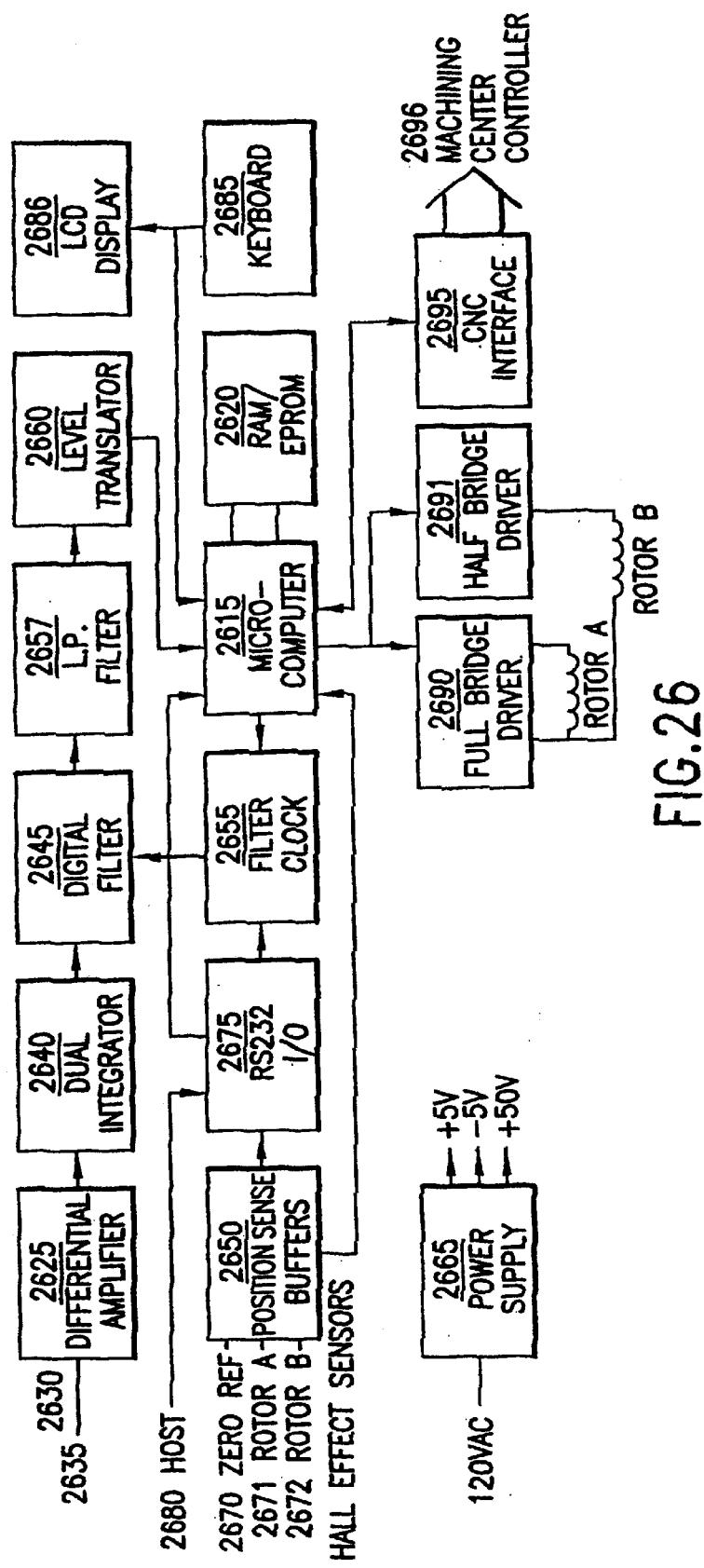
FIG. 26 is a block diagram of the balancer controller/power driver electronics of the preferred embodiment of this invention.

Thus, in the preferred embodiment of this invention each rotor can be selectively actuated to the appropriate position to provide machine unbalance compensation (B) Control Hardware To understand the control techniques used the various assemblies, reference is now made to FIG. 26. FIG. 26 shows controller 140, made in accordance with the teachings of the preferred embodiment of this invention. Specifically, controller 140, includes a microcomputer 2615 comprised of a Model 80C196KC, produced and commercially available from Motorola Corporation of Austin, Tex. Microcomputer 2615, as should be apparent to those of ordinary skill in the art, includes a sixteen bit central processing unit which is adapted to perform "on-line" needed calculations (to be discussed) and a ten bit analogue to digital converter which is used to digitize the analogue vibration signals received by the microcomputer 2616. The microcomputer 2615 also includes three edge sensitive timers which are adapted to measure the pulse duration of signals received from the position sensors (to be explained) and a pair of parallel ports which are used to communicate with a display or keyboard. Lastly, microcomputer 2615 includes a serial port of the RS-232C type. In the preferred embodiment of this invention, all of the control algorithms which will be discussed are computed and performed within microcomputer 2615.

As further shown in FIG. 26, controller 140 further includes a memory module, 2620 which is communicatively coupled to microcomputer 2615 and comprised of a Model PSD301, which is produced and commercially available from WSI Corporation. Specifically, memory 2620 includes, about 32K bytes of read only type memory and about 2K bytes of random access type memory. In the most preferred embodiment of this invention, all of the software programs which are used to define the operation of controller 140 are stored in memory 2620, including all of the software variables.

Controller 140, as shown in FIG. 26, also includes a differential amplifier 2625 which, in the preferred embodiment of this invention, is comprised of a model TLC2201 which is commercially available from and produced by the Texas Instruments Company of Austin, Tex. Amplifier 2625 is adapted to receive signal 2630 from either a velocity or acceleration transducer 2635. Signal 2630 is therefore indicative of the amount or amplitude of the measured vibration. Differential amplifier 2625 receives input from the transducer 2635, substantially eliminating common mode type noise such as that referred to as "60 Hz hum". The amplified and conditioned signal is then output and communicatively coupled to the dual integrator 2640.

In the preferred embodiment of the invention, dual integrator 2640 is comprised of a Model TLC 2202 which is commercially available and provided by Texas Instruments Corporation of Austin, Tex. Specifically, dual integrator 2640 receive the amplified and conditioned signal from amplifier 2625 and converts the signal to a displacement or position value associated with the tool or spindle. The converted signal is then communicatively coupled to the digital filter 2645 which, in the preferred embodiment of this invention, is comprised of a Model MAX 260 which is commercially available from and produced by the Maxim Corporation of Sunnyvale, Calif.

In the most preferred embodiment of this invention, filter 2645 is comprised of a fourth order digital filter of the narrow band type. Specifically, this filter is adapted to have a center frequency which is directly related to the rotational speed of the tool or spindle which is received and discussed in reference to the buffers 2650. As shown, the filter center frequency is controlled by an output signal emanating from filter clock 2665. In fact, in the most preferred embodiment of this invention, the center frequency of filter 2645 is about $1/100$ that of the frequency of the clock 2655. Moreover, the frequency of the clock 2655 is controlled by microcontroller 2615 in response to the rotational speed values that it receives. The output of this filter is received by a low pass filter 2657 which has a corner frequency of about 200 Hz. The low pass filter 2657 is communicatively coupled to the level translator 2660. In the preferred embodiment of this invention, the level translator 2660 is comprised of a Model TLC 2201 which is commercially available from and produced by the Texas Instruments Company of Austin, Tex. Specifically, level translator 2660 includes a single stage operational amplifier which is adapted to center the received vibration signal around the position corresponding to about one half of the voltage signal emanating from power supply 2665. In the most preferred embodiment of this invention, the output signal emanating from translator 2660 has a voltage level of about 2.5 volts DC in the absence of an input signal. The voltage signal emanating from translator 2660 is therefore representative of the displacement value originally obtained from the vibration or acceleration transducers. This signal is communicatively coupled to microcomputer 2615 and will be used in combination with the stored software In a manner to be discussed.

As further shown, controller 140 also includes a series of position sense buffers 2650 which, in the preferred embodiment of the invention, comprise commercially available models 74HC14 which are produced by the Motorola Company of Austin, Tex. Specifically, these buffers 2650 receive input signals from three Hall Effect devices 2670, 2671 and 2672, which in the preferred embodiment of the invention, comprise of commercially available model SS400 which are produced by Micro Switch (a division of Honeywell) of Freeport, Ill. The Hall Effect sensors are stationary with respect to the rotating machine and are mounted in close non-contacting proximity to the balancer assembly. The Hall Effect devices' 2670, 2671, and 2672 output signals are respectively representative of spindle position and the positions of rotors 350 and 351. More particularly, each of these devices or sensors 2670–1672 produces a pulse which is proportional to the length of time that the particular sensor is in proximity to the magnet targets located on the rotating assembly 130 and each rotor 350 and 351. As should be apparent to one of ordinary skill in the art, spindle speed can be computed by counting the rate of Hall Effect sensor pulses caused by the passing rotating assembly magnetic target. Angular position of each rotor relative to the rotating assembly can then be inferred by observing the phase shift between sensor pulses caused by magnetic targets on each rotor and pulses caused by the rotating assembly magnetic target.

The output data which is temporally stored in buffer 2650 is communicatively coupled to the microprocessor 2615 to be used by the software in a manner which will be described. As further shown, controller 140 includes a communications portion 2675 which, in the preferred embodiment of this invention, is comprised of a commercially available module or chip commonly referred to as a Model MAX232, which is produced by the Maxim Company. By use of portion 2675, microcontroller 2615 may communicate information to a typical host computer 2680 and receive information from host.

As further shown, controller 140 also includes a keyboard 2685 and display 2686 which, in the preferred embodiment of this invention, are respectively comprised of Models 74C923 and LM1200SYL components which are commercially available from and produced by the National Semiconductor Company and SCI respectfully. Specifically, keyboard 2685 is a twelve key keypad which is adapted to communicate with microcomputer 2615 to allow an operator to start, stop and control the operation of the balancer assembly 110. Display 2686 is a twenty four character by four line liquid crystal display which is adapted to present status and control information, such as vibration level, angle if imbalance, and rotor positions. Such information is received from microcontroller 2615.

As is also shown in FIG. 26, controller 140 includes a full bridge driver 2690 and a half bridge drive 2691 which are each comprised of commercially available components identified by model numbers IR2110 available from International Rectifier. It should be realized by one of ordinary skill in the art that a full bridge driver 2690 includes two such components while driver 2691 includes only one such component. In the most preferred embodiment of the invention, rotor 350 is controlled by driver 2690, while rotor 351 is controlled by the combination of drivers 2690 and 2691. Such control is achieved by the selective energization of the drivers 2690 and 2691. Such control is achieved by the selective energization of the drivers 2690 and 2691 by the microcontroller 2615 in response to the stored software program included within memory 2620. Lastly, controller 140 includes an interface portion 2695 which, in the preferred embodiment of the invention, is comprised of a commercially available input-output communication component identified as a Model OAC5. This "I/O" component may be obtained from Grayhill Corporation having an office in Detroit, Mich. Component 2695 is communicatively coupled to microcontroller 140 in a manner which will allow the microcontroller to communicate with a conventional numerical contolller 2696, such as an Allen-Bradley Model 8600. Conventional numerical controller signals such as "RUN", "READ" and "ALARM" may be passed to the numeric controller. From the foregoing it should be apparent to one of ordinary skill in the art that a microcontroller 140 receives signals indicative of spindle vibration and rotor position and, in response to the received signals, selectively energizes, or causes to be energized, drivers 2690 and 2691, in a manner which has been previously described and which will allow the rotors to rotate to the desired position. It is this driver energization which causes the rotors to move, positioning the heavy spots in the desired manner to compensate for machine unbalance.

As shown in FIG. 5, each rotor 350, 351 has an identifiable position represented by a certain respective angle measured with respect to a fixed arbitrary reference point. Moreover, each rotor 350, 351 has a certain pre-determined imbalance magnitude 510, 511 associated with it. The respective imbalance magnitudes 510, 511, in combination with the angular position, defines a vector having a directional component fixed by the angular position and a magnitude fixed by the amount of imbalance. A net correction vector 520 results from the vector addition of the two vectors 510 and 511.

(C) Automatic Machine Balancing Method

In the preferred embodiment of the invention, microprocessor based controller 2611 contains software algorithms stored in memory which cause the automatic operation of the balancer.

To compensate for rotating machine unbalance, the unbalance magnitude and angular position on the spindle must be estimated. The following discussion details the calculations for this estimation and steps for automatic balancing in the preferred embodiment of the invention.

Figure 27:
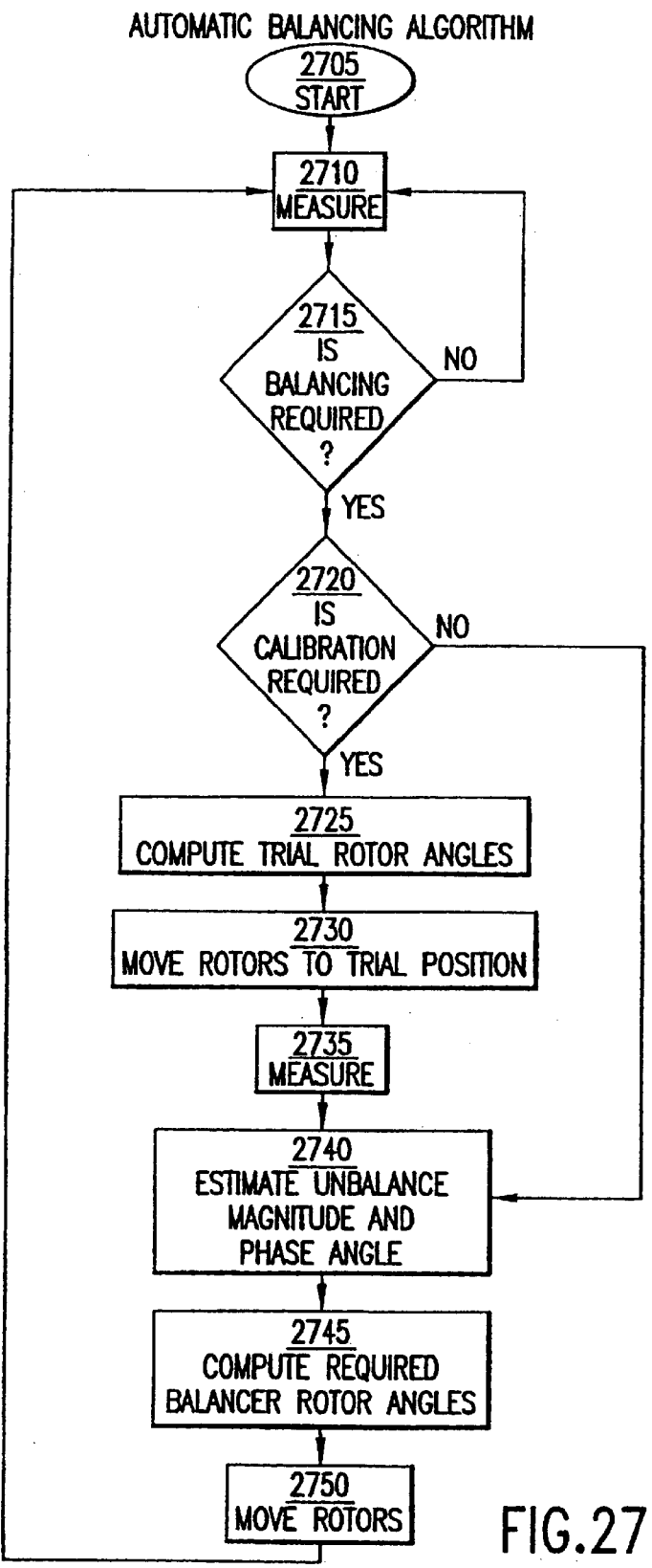
FIG. 27 is a flow chart illustrating the, sequence of steps associated with the automatic balancing functions of the preferred embodiment of this invention.

The relationship between vibration amplitude and spindle unbalance magnitude is assumed to be linear but unknown. The assumption of linearity is very good for most applications, since although vibration magnitudes are significant, they are relatively low. A mathematical algorithm is used to estimate unbalance magnitude and angular position based on certain measurable quantities. To accomplish the estimation when no machine data is previously stored, a "trial" balance step is required for calibration. This means that after start-up, the balancer "ballast" must be moved to an arbitrary trial position before it can be moved to the final correction position. Since the balancer rotors may "slip" during spindle start-up due to limited holding torque, the initial balance correction would not necessarily be "neutral". Balance correction could be in any position. The vector math equations described below take this possibility into account. For certain applications, however, the vibration-unbalance relationship for a machine configuration would be known a priori. In such instances, calibration using a trial balance correction would be unnecessary. To reduce balance time required, the balancer rotors could be directly moved to the appropriate compensating positions virtually immediately after spindle start-up. It is prudent, however, to implement a routine for the more general case where the vibration-unbalance ratio is not necessarily known. Steps in the automatic balancing algorithm for the general case are outlined in the flow chart of FIG. 27. The steps are described below:

Step 1, Machine Start-up 2705:
Upon start-up, the balancer controller begins the automatic machine monitoring/balancing routine.

Step 2, Measurement 2710:
The following quantities are measured using the vibration transducer and shaft and rotor position sensors:

Initial vibration amplitude $v_1$ (peak amplitude in units of length)

Initial vibration phase angle $\theta_{v1}$ (radians, with respect to the arbitrary machine reference)

Initial balancer rotor angles $\theta_{a1}, \theta_{b1}$

Step 3, Compare 2715:
The peak machine vibration level is compared to a preset vibration limit. If vibration exceeds the maximum limit, the balancing routine is implemented. If vibration remains below the set limit, the balancer controller returns to the measurement step 2 2710 and vibration is continuously monitored.

Step 4, Calibration choice 2720:
If machine stiffness data is available which maps speed and unbalance information to machine vibration level, no balancer calibration is required and the algorithm skips directly to step 8 2740.

Step 5, Trial rotor angle computation 2725:
The trial calibration angles for the balancer rotors are chosen based on certain criteria. The criteria include but are not limited to: 1)Minimizing unbalance during the calibration step; 2) Minimizing balancer error due to measurement uncertainties; or 3) Minimizing time required for balancing.

Step 6, Rotor actuation to trial positions 2730:
The rotors are actuated to the required trial positions using driver 120.

Step 7, Measurement 2735:
The following quantities are measured:

"Trial" vibration amplitude $v_2$ (peak amplitude in units of length)

"Trial" vibration phase angle $\theta_{v2}$ (radians, with respect to the arbitrary machine reference)

"Trial" balance rotor angles $\theta_{a2}, \theta_{b2}$

Step 8, Estimation 2740:
Using the values measured above, the controller calculates the unbalance magnitude $B_u$ (in units of mass-length, or unit-less % of balancer capacity) and phase angle $\theta_u$. The estimation method is described below in more detail.

Step 9, Balance rotor angle computation 2745:
Calculate the balancer rotor angles $\theta_a$ and $\theta_b$ that will provide the required correction vector. If the respective rotor unbalance magnitudes are very closely similar, for example, the rotors would be placed at appropriate equal angles from the effective correction angle. Which rotor moves to which position could be decided based on certain criteria such as: 1) minimizing time to balance; or 2) minimizing unbalance magnitude present during the time the rotors move.

Step 10, Rotor actuation 2750:
The rotors are moved to the required positions using the power driver 120.

The controller then returns to step 2 2710 to monitor machine vibration until changes in machine parameters make further balancing necessary.

Rotating unbalance in the machine is estimated in step 8 2740 using concepts from vector algebra. To facilitate estimation, the measured vectors from steps 2 2710 and 7

2735 are broken down into their Cartesian x and y-direction components as follows:

$$v_{1x} = v_1\cos(\theta_{v1}) \quad x_{1a} = B_a\cos(\theta_{a1}) \quad x_{b1} = B_b\cos(\theta_{b1})$$
$$v_{1y} = v_1\sin(\theta_{v1}) \quad y_{a1} = B_a\sin(\theta_{a1}) \quad y_{b1} = B_b\sin(\theta_{b1})$$
$$v_{2x} = v_2\cos(\theta_{v2}) \quad x_{a2} = B_a\cos(\theta_{a2}) \quad x_{b2} = B_b\cos(\theta_{b2})$$
$$v_{2y} = v_2\sin(\theta_{v2}) \quad y_{a2} = B_a\sin(\theta_{a2}) \quad y_{b2} = B_b\sin(\theta_{b2})$$

eqs. 7a-7f
eqs. 7g-7l

Note that the peak vibration level signal component values in the left column have units of length. The rotor unbalance component values are unit-less or have units of unbalance (mass-length). The rotors have unbalance magnitudes of $B_a$ and $B_b$ respectively. These values are assumed to be known and fixed.

With the balancer mounted on a machine, the total rotating unbalance will consist of the vector sum of balancer rotor unbalance magnitudes and the inherent machine rotating unbalance. The measured vibration values, therefore, also result from the vector sum of each unbalance source. We define the unknown machine rotating unbalance components as $X_u$ and $Y_u$. We also define the relationship between rotating unbalance and vibration level as R. This ratio R is a function of bearing and shaft stiffness and is also assumed to be unknown. If R is known for a given machine operating condition, then the estimation is much simpler and is not shown here. The following equations define the unbalance-vibration relationship in each component direction for the both initial and trial measurements:

$$x_{a1} + x_{b1} + x_u = Rv_{1x}$$
$$y_{a1} + y_{b1} + y_u = Rv_{1y}$$
$$x_{a2} + x_{b2} + x_u = Rv_{2x}$$
$$y_{a2} + y_{b2} + y_u + Rv_{2y}$$

eqs. 8a-8d

There are three unknowns and four equations. Since we only need three equations to solve for the unknowns, we can discard the last equation and obtain the following linear algebraic system of equations:

$$\begin{bmatrix} 1 & 0 & -v_{1x} \\ 0 & 1 & -v_{1y} \\ 1 & 0 & -v_{2x} \end{bmatrix} \begin{bmatrix} x_u \\ y_u \\ R \end{bmatrix} = \begin{bmatrix} -(x_{a1} + x_{b1}) \\ -(y_{a1} + y_{b1}) \\ -(x_{a2} + x_{b2}) \end{bmatrix}$$

eq. 9

To reduce estimation error due to inherent measurement uncertainties, the last equation can be retained and the over-determined system solved in the least squares sense. The determinate system of equation 9, however, can be solved simply by matrix inversion as shown here:

$$\begin{bmatrix} x_u \\ y_u \\ R \end{bmatrix} = \begin{bmatrix} 1 & 0 & -v_{1x} \\ 0 & 1 & -v_{1y} \\ 1 & 0 & -v_{2x} \end{bmatrix}^{-1} \begin{bmatrix} -(x_{a1} + x_{b1}) \\ -(y_{a1} + y_{b1}) \\ -(x_{a2} + x_{b2}) \end{bmatrix}$$

Symbolically evaluating the inverse yields $$\begin{bmatrix} x_u \\ y_u \\ R \end{bmatrix} = \frac{1}{(x_{v1} - x_{v2})} \begin{bmatrix} -v_{2x} & 0 & v_{1x} \\ -v_{1y} & (v_{1x} - v_{2x}) & y_{1y} \\ -1 & 0 & 1 \end{bmatrix} \begin{bmatrix} -(x_{a1} + x_{b1}) \\ -(y_{a1} + y_{b1}) \\ -(x_{a2} + x_{b2}) \end{bmatrix}$$

eq. 10

The magnitude and phase angle of the unbalance vector can then be represented by $B_u$ and $\theta_u$ given by $$B_u = \sqrt{x_u^2 + y_u^2}$$
$$\theta_u = \arctan\left(\frac{y_u}{x_u}\right)$$

eqs. 11a, 11b

The unbalance angle quadrant must be determined accurately for successful balance compensation. Most high level programming language compilers include an intrinsic function "atan2" which calculates the angle of a vector in the appropriate quadrant given x and y-direction vector components.

The required balance correction magnitude $B_c$ will be the same as the unbalance magnitude. The correction angle $\theta_c$ will be 180° (or $\pi$ radians) away from the unbalance.

$$B_c = B_u$$
$$\theta_c = \theta_u + \pi$$

eqs. 12a, 12b

The correction angle should be mapped back into the appropriate polar quadrant if it exceeds 360°. This correction would then be implemented using the two balancer rotors. The corresponding rotor angles $\theta_a$, and $\theta_b$ for equally unbalance rotors are given by $$\theta_a = \theta_c - \arccos(B_u)$$
$$\theta_b = 2\theta_c - \theta_a$$

eqs. 13a, 13b

In some cases the rotors would have slightly different unbalances due to manufacturing variations. In such cases, slightly more complicated formulas must be used which utilize trigonometry which should be known to one of ordinary skill in the art.

Which rotor should move to which position is then determined such that the rotors travel the minimum combined distance. This minimizes time required for the final balancing step.

It is to be understood that the invention is not limited to the exact construction or method illustrated and described above. Various changes may be made without departing from the spirit and scope of the inventions defined in the following claim.

We claim:

1. A machine balancer comprising:
   at least one rotor, movable disposed upon said machine and containing at least one magnet;
   a driver adapted to selectively generate a magnetic field effective to cause said rotor to move, thereby balancing said machine; and
   a sensor in close proximity to said movable rotor, said sensor being adapted to generate an output signal upon the passing of said at least one magnet in close proximity to said sensor.

2. The machine balancer of claim 1 wherein said sensor comprises a Hall Effect sensor.

3. The machine balancer of claim 1 further comprising a processor, coupled to said sensor and adapted to receive said at least one output signal and to use said at least on an output signal to determine the orientation of said movable rotor.

4. A method for determining the orientation of a movable rotor comprising the steps of:
   placing a target upon said movable rotor;
   providing a sensor in close proximity to said movable rotor;
   adapting said sensor to provide an output signal upon the passing of said target; and;

using said output signal to determine said orientation of said movable rotor.

5. The method of claim 4 wherein said sensor is a Hall Effect sensor.

6. A method for use in combination with a movable rotor disposed upon a machine, said method being effective to determine the angular position of said movable rotor relative to said machine, said method comprising the steps of:

providing at least one target upon said movable rotor;

providing at least one sensor adapted to produce an output signal upon the passing of said target in close proximity to said at least one sensor; and positioning said at least one sensor in close proximity to said movable rotor, thereby causing said output signal to be produced upon substantially each passing of said target in close proximity to said at least one sensor, said output signal being indicative of said angular position of said movable rotor relative to said machine.

7. The method of claim 6 wherein said at least one sensor comprises a Hall Effect sensor.

8. The method of claim 6 further comprising the steps of providing a processor; and coupling said processor to said at least one output signal thereby allowing said processor to automatically calculate said angular position of said movable rotor relative to said machine.

9. The method of claim 6 wherein said target comprises a magent.

* * * * *